(12) United States Patent
Scott

(10) Patent No.: US 7,058,660 B2
(45) Date of Patent: Jun. 6, 2006

(54) SYSTEM AND METHOD FOR NETWORK-BASED PROJECT MANAGEMENT

(75) Inventor: Kelly W. Scott, Columbus, OH (US)

(73) Assignee: Bank One Corporation, Chicago, IL (US)

( * ) Notice: Subject to any disclaimer, the term of this patent is extended or adjusted under 35 U.S.C. 154(b) by 592 days.

(21) Appl. No.: 10/262,286

(22) Filed: Oct. 2, 2002

(65) Prior Publication Data

US 2004/0068517 A1  Apr. 8, 2004

(51) Int. Cl.
*G06F 17/00* (2006.01)

(52) U.S. Cl. .................. 707/104.1; 707/10; 717/100; 717/101

(58) Field of Classification Search ................ 707/3, 707/100, 104.1; 719/204, 219; 717/100–101
See application file for complete search history.

(56) References Cited

U.S. PATENT DOCUMENTS

| | | |
|---|---|---|
| 3,938,091 A | 2/1976 | Liu |
| 4,321,672 A | 3/1982 | Thomson |
| 4,567,359 A | 1/1986 | Lockwood |
| 4,633,397 A | 12/1986 | Macco |
| 4,695,880 A | 9/1987 | Johnson |
| 4,696,491 A | 9/1987 | Stenger |
| 4,713,761 A | 12/1987 | Sharpe |
| 4,725,719 A | 2/1988 | Roach |
| 4,823,264 A | 4/1989 | Deming |
| 4,882,675 A | 11/1989 | Nichtberger |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,157,717 A | 10/1992 | Hitchcock |
| 5,220,501 A | 6/1993 | Lawlor |
| 5,265,033 A | 11/1993 | Vajk |
| 5,317,683 A | 5/1994 | Hager |
| 5,321,841 A | 6/1994 | East |
| 5,351,186 A | 9/1994 | Bullock |
| 5,412,708 A | 5/1995 | Katz |
| 5,420,405 A | 5/1995 | Chasek |
| 5,424,938 A | 6/1995 | Wagner |
| 5,446,740 A | 8/1995 | Yien |
| 5,450,537 A | 9/1995 | Hirai |
| 5,467,269 A | 11/1995 | Flaten |
| 5,473,143 A | 12/1995 | Vak |

(Continued)

OTHER PUBLICATIONS eCharge, eCharge Corporation, www.echarge.com, Dec. 3, 1999.

(Continued)

*Primary Examiner*—Mohammad Ali
*Assistant Examiner*—Sana Al-Hashemi
(74) *Attorney, Agent, or Firm*—Hunton & Williams LLP

(57) ABSTRACT

A system for managing a project and its associated information over a network is presented. The system includes a project information database associated with the network and a project information management tool. The project information database stores information associated with a project being carried out by a corporate entity having at least one sub-entity. The project information management tool includes a project information module to manage the information associated with the project, and at least one cross-sub-entity project-component module. The cross-sub-entity project module manages and tracks overall information and sub-entity specific information, of the information associated with the project, related to the project-component.

22 Claims, 22 Drawing Sheets

U.S. PATENT DOCUMENTS

| | | |
|---|---|---|
| 5,473,732 A | 12/1995 | Chang |
| 5,485,370 A | 1/1996 | Naylor |
| 5,511,117 A | 4/1996 | Zazzera |
| 5,532,920 A | 7/1996 | Hartrick |
| 5,537,314 A | 7/1996 | Kanter |
| 5,537,473 A | 7/1996 | Saward |
| 5,544,086 A | 8/1996 | Davis |
| 5,557,518 A | 9/1996 | Rosen |
| 5,568,489 A | 10/1996 | Yien |
| 5,570,465 A | 10/1996 | Tsakanikas |
| 5,590,197 A | 12/1996 | Chen |
| 5,592,560 A | 1/1997 | Deaton |
| 5,594,837 A | 1/1997 | Noyes |
| 5,598,557 A | 1/1997 | Doner |
| 5,606,496 A | 2/1997 | D'Agostino |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,638,457 A | 6/1997 | Deaton |
| 5,644,493 A | 7/1997 | Motai |
| 5,652,786 A | 7/1997 | Rogers |
| 5,653,914 A | 8/1997 | Gruener |
| 5,657,383 A | 8/1997 | Gerber |
| 5,659,165 A | 8/1997 | Jennings |
| 5,664,115 A | 9/1997 | Fraser |
| 5,675,662 A | 10/1997 | Deaton |
| 5,684,870 A | 11/1997 | Maloney |
| 5,710,887 A | 1/1998 | Chelliah |
| 5,710,889 A | 1/1998 | Clark |
| 5,727,163 A | 3/1998 | Bezos |
| 5,734,838 A | 3/1998 | Robinson |
| 5,740,231 A | 4/1998 | Cohn |
| 5,754,840 A | 5/1998 | Rivette |
| 5,758,328 A | 5/1998 | Giovannoli |
| 5,761,647 A | 6/1998 | Boushy |
| 5,761,661 A | 6/1998 | Coussens |
| 5,774,122 A | 6/1998 | Kojima |
| 5,778,178 A | 7/1998 | Arunachalam |
| 5,784,562 A | 7/1998 | Diener |
| 5,790,650 A | 8/1998 | Dunn |
| 5,790,785 A | 8/1998 | Klug |
| 5,793,861 A | 8/1998 | Haigh |
| 5,794,221 A | 8/1998 | Egendorf |
| 5,794,259 A | 8/1998 | Kikinis |
| 5,796,395 A | 8/1998 | De Hond |
| 5,802,498 A | 9/1998 | Comesanas |
| 5,802,502 A | 9/1998 | Gell |
| 5,815,657 A | 9/1998 | Williams |
| 5,815,683 A | 9/1998 | Vogler |
| 5,819,092 A | 10/1998 | Ferguson |
| 5,819,285 A | 10/1998 | Damico |
| 5,826,241 A | 10/1998 | Stein |
| 5,826,245 A | 10/1998 | Sandberg-Diment |
| 5,826,250 A | 10/1998 | Trefler |
| 5,832,476 A | 11/1998 | Tada |
| 5,835,580 A | 11/1998 | Fraser |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,845,260 A | 12/1998 | Nakano |
| 5,847,709 A | 12/1998 | Card |
| 5,848,427 A | 12/1998 | Hyodo |
| 5,862,223 A | 1/1999 | Walker |
| 5,870,456 A | 2/1999 | Rogers |
| 5,870,724 A | 2/1999 | Lawlor |
| 5,873,072 A | 2/1999 | Kight |
| 5,884,032 A | 3/1999 | Bateman |
| 5,884,288 A | 3/1999 | Chang |
| 5,889,863 A | 3/1999 | Weber |
| 5,892,900 A | 4/1999 | Ginter |
| 5,898,780 A | 4/1999 | Liu |
| 5,903,881 A | 5/1999 | Schrader |
| 5,914,472 A | 6/1999 | Foladare |
| 5,915,244 A | 6/1999 | Jack |
| 5,918,214 A | 6/1999 | Perkowski |
| 5,918,217 A | 6/1999 | Maggioncalda |
| 5,918,239 A | 6/1999 | Allen |
| 5,926,812 A | 7/1999 | Hilsenrath |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel |
| 5,952,641 A | 9/1999 | Korshun |
| 5,953,710 A | 9/1999 | Fleming |
| 5,958,007 A | 9/1999 | Lee |
| 5,960,411 A | 9/1999 | Hartman |
| 5,963,952 A | 10/1999 | Smith |
| 5,963,953 A | 10/1999 | Cram |
| 5,969,318 A | 10/1999 | Mackenthun |
| 5,970,482 A | 10/1999 | Pham |
| 5,982,370 A | 11/1999 | Kamper |
| 5,991,751 A | 11/1999 | Rivette |
| 5,991,780 A | 11/1999 | Rivette |
| 5,995,948 A | 11/1999 | Whitford |
| 5,999,907 A | 12/1999 | Donner |
| 6,005,939 A | 12/1999 | Fortenberry |
| 6,012,088 A | 1/2000 | Li |
| 6,014,636 A | 1/2000 | Reeder |
| 6,014,638 A | 1/2000 | Burge |
| 6,018,714 A | 1/2000 | Risen |
| 6,026,429 A | 2/2000 | Jones |
| 6,032,147 A | 2/2000 | Williams |
| 6,049,835 A | 4/2000 | Gagnon |
| 6,055,637 A | 4/2000 | Hudson |
| 6,061,665 A | 5/2000 | Bahreman |
| 6,064,987 A | 5/2000 | Walker |
| 6,081,810 A | 6/2000 | Rosenzweig |
| 6,088,683 A | 7/2000 | Jalili |
| 6,088,700 A | 7/2000 | Larsen |
| 6,098,070 A | 8/2000 | Maxwell |
| 6,112,181 A | 8/2000 | Shear |
| 6,131,810 A | 10/2000 | Weiss |
| 6,134,549 A | 10/2000 | Regnier |
| 6,144,948 A | 11/2000 | Walker |
| 6,148,293 A | 11/2000 | King |
| 6,170,011 B1 | 1/2001 | Macleod Beck |
| 6,185,242 B1 | 2/2001 | Arthur |
| 6,189,029 B1 | 2/2001 | Fuerst |
| 6,195,644 B1 | 2/2001 | Bowie |
| 6,201,948 B1 | 3/2001 | Cook |
| 6,370,562 B1 * | 4/2002 | Page et al. .................. 709/204 |
| 6,519,763 B1 * | 2/2003 | Kaufer et al. ............... 717/101 |
| 6,836,803 B1 * | 12/2004 | Swartz et al. ............... 709/227 |
| 2001/0054003 A1 | 12/2001 | Chien |
| 2002/0010599 A1 | 1/2002 | Levison |

OTHER PUBLICATIONS

Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 25, 1999.
OMG, What is CORBA?, , www.omg.com May 25, 1999.
Overview of CORBA, , www.omg.com, May 25, 1999.

JAVA, JAVA ™ Technology in the Real World, java.sun.com, May 21, 1999.
JAVA, JAVA ™ Servlet API, java.sun.com, May 21, 1999.
JAVA, Staying in Touch with JNDI, java.sun.com, May 21, 1999.
JAVA, JAVA ™ Remote Method Invocation (RMI) Interface, java.sun.com, May 21, 1999.
JAVA, Banking on JAVA ™ Technology, java.sun.com, May 21, 1999.
JAVA, The JDBC™ Data Access API, java.sun.com, May 21, 1999.
Anne Thomas, Enterprise JAVABEANS™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash ' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Bucks in Cyberspace, American Banker, May 5, 1995.
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guidelines, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers By Engineers, Thomas Publishing Company, Apr. 26, 1999.
Harris InfoSource, Apr. 26, 1999.
Welcome to MUSE, MUSE Technologies, Apr. 26, 1999.
Product Data Intergration Technologies, Inc., PDIT, Apr. 26, 1999.
SBA: Pro-Net, SBA, Apr. 26, 1999.
FreeMarkets, FreeMarkets Online, Inc., Apr. 26, 1999.
Associates National Bank (DE) Credit Card Services, The Associates, www.theassocitheassociates.atescomcom/consumer/credit_cards/rnain.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu :80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wyswyg://0/http://www.dialogclassic.com/history, Business Wire, Apr. 24, 1998, p4241047.
Richard Mitchell, Netlink Goes After An Unbanked Niche, wysiwyg://0/http://www.dialogclassic.com/history, ISSN: 1093-1279, Sep. 1999.

* cited by examiner

| 02 PROJECT IINFORMATION - EXAMPLE RECORD | 700 |
|---|---|
| PROJECT INFORMATION RECORD | |

GENERAL PROJECT INFORMATION — 702

NOTE: All General Information fields are marked as "required"; however, hierarchy fields that are not applicable to the <project> record will remain blank.

| | |
|---|---|
| ✓ Initiative: | ✓ Participating LOB(s) / SU(s): |
| ✓ Program: | |
| ✓ Project: | |
| ✓ Subproject: | |
| ✓ Executive Sponsor: | Start Date: |
| ✓ Program Manager: | Revised Start Date: |
| ✓ Overall Project Manager: | End Date: |
| Technical Officer: | Revised End Date: |
| Business Owner: | On Time?: |
| Finance Owner: | If "No", then Comment: |
| Technology Owner: | [LOB 1] Resources?: |
| eBiz?: | Uses DP Framework?: |
| Overall Status: | |
| ✓ Project Objective Description: | |
| Benefit: | |

TRACKING INFORMATION — 704

| | |
|---|---|
| Major Project Code: | Cost Center Number: |
| Sub-project Code: | Cost Center Name: |
| Billing LOB: | CRR Number: |
| Billing Business Unit: | CERP: |
| Primary Service Request: | Change Management Number: |
| Other Service Requests: | |

LOB 2 INFORMATION — 706

| | |
|---|---|
| Project Manager: | Department: |
| Business Unit: | Status: |

CORPORATE ADMINISTRATIVE SERVICES INFORMATION — 708

| | |
|---|---|
| Project Name: | Start Date: |
| Project Manager: | End Date: |
| Business Unit: | Cost Center: |
| Project Objective/Description: | Size: |
| | Status: |

FIG. 7

INITIATIVE INFORMATION RECORD 800

GENERAL INFORMATION — 802

| Initiative Name: | Benefit: |
| ✓ LOB / SU Owner: | Strategy: |
| Description: | |
| ✓ | |

Related Programs: — 804

| Program | Manager | Description | Start Date | End Date |
|---------|---------|-------------|------------|----------|
|         |         |             |            |          |

RECORD ACCESS AND EDIT HISTORY — 820

| Access: | |
|---------|---|

| Name | Date/Time | Type |
|------|-----------|------|
|      |           |      |

FIG. 8

| 03 | MILESTONES - EXAMPLE RECORD | | 1000 |
|---|---|---|---|

MILESTONE RECORD

REPORTING INFORMATION — 1002

*NOTE: All Reporting Information hierarchy and organization fields are marked as "required"; however, the hierarchy fields that are not applicable to the <project> will remain blank.*

| | |
|---|---|
| ✓ Initiative: | ✓ Participating LOB(s) / SU(s): |
| ✓ Program: | ✓ Business Unit(s): |
| ✓ Project: | |
| ✓ Sub-project: | |
| ✓ Milestone Name: | |
| Phase: | |

DATES — 1004

| | |
|---|---|
| Original Start Date: | Original End Date: |
| Revised Start Date: | Revised End Date: |

TRACKING INFORMATION — 1006

Owner:
Team Owner:
Milestone Type:

STATUS INFORMATION — 1008

| | |
|---|---|
| ✓ Status (Choose One) : | ✓ Risk (Choose One) : |
| q Ahead of Schedule | q Red |
| q Behind Schedule | q Yellow |
| q Complete | q Green |
| q Not Started | q N/A |
| q On Schedule | |

Should this milestone appear on status reports? (Yes)
Should this milestone be escalated to the program level?
Percent Complete:
Other Comments:
Attach Documents Here:

RECORD ACCESS AND EDIT HISTORY

| Access: | | |
|---|---|---|
| Name | Date/Time | Type |
| | | |

FIG. 10

| 04 | ISSUES - EXAMPLE RECORD | | | | |
|---|---|---|---|---|---|

ISSUE RECORD

REPORTING INFORMATION — 1102

NOTE: All Reporting Information hierarchy and organization fields are marked as "required"; however, the hierarchy fields that are not applicable to the <project> will remain blank.

- ✓ Initiative:
- ✓ Program:
- ✓ Project:
- ✓ Sub-project:

- ✓ Participating LOB(s) / SU(s):
- ✓ Business Unit(s):

ISSUE DESCRIPTION — 1104

- ✓ Issue Number:
- Issue Date:
- Raised By:
- ✓ Issue Description:

- ✓ Issue Title:
- Issue Category:
- Phase:

STATUS & SEVERITY — 1106

| ✓ Status: | ✓ Severity: | ✓ Risk: | Problem Solving Step: |
|---|---|---|---|
| q Open | q Critical | q Red | q (1) Identify Problem |
| q Closed | q Major | q Yellow | q (2) Analyze Problem |
| q In Progress | q Ordinary | q Green | q (3) Select Solution |
| | | | q (4) Implement Solution |
| | | | q (5) Evaluate Solution |
| | | | q N/A |

IMPACTS — 1108

Should this issues appear on status reports? (Yes)
Should this issue be escalated to the program level?

Impacts:
- q Issues — Comments:
- q Scope — Comments:
- q Schedule — Comments:
- q Resources — Comments:
- q Financial — Comments:
- q Other — Comments:

RESOLUTION — 1110

- ✓ Assigned To:
- Resolution:

Target Date:
Assigned Team:

Issue Updates: — 1112

Attachments:

FIG. 11

| 05 | CHANGE CONTROLS - EXAMPLE RECORD | |
|---|---|---|

1200

CHANGE CONTROL RECORD

REPORTING INFORMATION — 1202

*NOTE: All Reporting Information hierarchy and organization fields are marked as "required"; however, the hierarchy fields that are not applicable to the <project> will remain blank.*

- ✓ Initiative:
- ✓ Program:
- ✓ Project:
- ✓ Sub-project:
- ✓ Participating LOB(s) / SU(s):
- ✓ Business Unit(s):

IDENTIFICATION — 1204

- ✓ Change Control Number:
- ✓ Submitted By:
- Client:
- Project Manager:
- ✓ Change Control Name:
- ✓ Date Submitted:
- Related Requests:

Description:
Benefits:
Priority:
Attach Documents Here:

IMPACTS — 1206

| Impact Assessment Conducted By: | Impacts: | | |
|---|---|---|---|
| Date Completed: | q | Issues | Comments: |
| Should this Change Control appear on the Status Report? (Yes) | q | Scope | Comments: |
| | q | Schedule | Comments: |
| Should this Change Control be escalated to a program level? | q | Resources | Comments: |
| | q | Financial | Comments: |
| | q | Quality | Comments: |
| | q | Team(s) | Comments: |
| | q | Other | Comments: |

ACTION TAKEN — 1208

(Please note that selecting a different action will NOT remove the comments for the prior action)

| q | In Progress | Name of Creator: | As of: |
|---|---|---|---|
| q | Accept | Name of Approver: | As of: |
| q | Defer | Name of Approver: | Reason: |
| q | Reject | Name of Approver: | Reason: |
| q | Implemented | | As of: |

FIG. 12

| 06 | DOCUMENT - EXAMPLE RECORD | | 1300 |

DOCUMENT RECORD

REPORTING INFORMATION — 1302

*NOTE: All Reporting Information hierarchy and organization fields are marked as "required"; however, the hierarchy fields that are not applicable to the <project> will remain blank.*

| ✓ Initiative: | ✓ Participating LOB(s) / SU(s): |
|---|---|
| ✓ Program: | ✓ Business Unit(s): |
| ✓ Project: | |
| ✓ Sub-project | |

DOCUMENT INFORMATION — 1304

○ Deliverable  ○ Template  ○ Other

| ✓ Category: | Phase: |
|---|---|

Created By:
Team:
Created On:
Assigned To:
Status:

| q | Not Started | As of: |
| q | In Progress | As of: |
| q | Overdue | As of: |
| q | Ongoing | As of: |
| q | Completed | As of: |
| q | Approved | As of: |

✓   Title:

Purpose:

Attach Document Here:

Comments:

FIG. 13

Project Status Report — 1400

GENERAL PROJECT INFORMATION — 1402

☐ View Project Information  ☐ Import Project Information

| | |
|---|---|
| Executive Sponsor: | Start Date: |
| Program Manager: | End Date: |
| Overall Project Manager: | Participating LOB(s) / SU(s): |
| | Service Request Number: |

Project Description:

LINE OF BUSINESS 1 INFORMATION — 1404

☐ View Project Information  ☐ Import Project Information

| | |
|---|---|
| Executive Sponsor: | Status: |
| Program Manager: | Start Date: |
| Overall Project Manager: | End Date: |
| Project Manager: | Participating LOB(s) / SU(s): |
| Business Unit: | Service Request Number: |
| Department: | |

STATUS SUMMARY — 1406

| Category | Risk (R/Y/G) | Trend (+/-) | Comments |
|---|---|---|---|
| Overall Assessment | | | |
| Issues | | | |
| Scope | | | |
| Schedule | | | |
| Resources | | | |
| Financial | | | |

Green = No significant issues exist / Yellow = Significant issues have arisen; considered manageable / Red = Significant issues; project in jeopardy.

Trend: "+" = Status is improving; "-" = Status is declining

FIG. 14

Delivery Process Report — 1500

DELIVERY PROCESS STATUS — 1502

☐ Hide Section ☐ Show Section
☐ View Phase Information ☐ Import Phase Dates

| Phase | Orig Start Date | Rev Start Date | Act Start Date | Orig End Date | Rev End Date | Act End Date |
|---|---|---|---|---|---|---|
| Initiation | | | | | | |
| Frame Idea | | | | | | |
| Assess Concept | | | | | | |
| Manufacturing | | | | | | |
| Validate Scope | | | | | | |
| Design | | | | | | |
| Build | | | | | | |
| Deployment | | | | | | |
| Launch | | | | | | |
| Maintain | | | | | | |

DELIVERY PROCESS RISK — 1504

☐ Hide Section ☐ Show Section

☐ *View Risk Information*   ☐ *Import Risk Information*

| Phase | Overall Risk | Checkpoint Date | Overall Comments | LOB #1 Risk | Checkpoint Date | LOB #1 Comments | LOB #2 Risk | Checkpoint Date | LOB #2 Comments |
|---|---|---|---|---|---|---|---|---|---|
| Initiation | | | | | | | | | |
| Frame Idea | | | | | | | | | |
| Assess Concept | | | | | | | | | |
| Manufacturing | | | | | | | | | |
| Validate Scope | | | | | | | | | |
| Design | | | | | | | | | |
| Build | | | | | | | | | |
| Deployment | | | | | | | | | |
| Launch | | | | | | | | | |
| Maintain | | | | | | | | | |

FIG. 15

| 08 | TEAM MEMBER STATUS REPORTS - EXAMPLE RECORD | 1600 |

TEAM MEMBER STATUS REPORT

REPORTING INFORMATION — 1602

*NOTE: All Reporting Information hierarchy and organization fields are marked as "required"; however, the hierarchy fields that are not applicable to the <project> will remain blank.*

- ✓ Initiative:
- ✓ Program:
- ✓ Project:
- ✓ Sub-project:

- ✓ Participating LOB(s) / SU(s):
- ✓ Business Unit(s):

To:
From: ○  ○
Team(s):
Date:
Subject: <Month><Year> Status Report

Status:    Draft        Completed

Issues and/or Opportunities

Key Accomplishments This Period

Key Accomplishments Next Period

Comments

Attachments

FIG. 16

| 09 | CONTACT - EXAMPLE RECORD |
|---|---|
| | *"Approval" of this section is not included in the 4/2 UC signoff.* |

CONTACT RECORD

REPORTING INFORMATION — 1702

*NOTE: All Reporting Information hierarchy and organization fields are marked as "required"; however, the hierarchy fields that are not applicable to the <project> will remain blank.*

| ✓ Initiative: | ✓ Participating LOB(s) / SU(s): |
|---|---|
| ✓ Program: | ✓ Business Unit(s): |
| ✓ Project: | |
| ✓ Sub-project: | |

NAME OF CONTACT — 1704

| ✓ Name: | Company: |
|---|---|
| Manager: | Cost Center Number: |
| ✓ Employee Type: | |

GENERAL INFORMATION — 1706

| Office Phone: | Alternate Name: |
|---|---|
| Secondary Phone: | Alternate Number: |
| International Phone: | Administrative Assistant Name: |
| Fax Number: | Administrative Assistant Number: |
| Pager Number: | |
| PIN Number: | |
| Internal Zip: | |
| Location: | |
| Internet Mail Address: | |

OTHER CONTACT INFORMATION — 1708

| LOB/SU Represented: | Team: |
|---|---|
| Project(s): | Sub Team: |
| Other information: | Team Role: |

| 10 | MANAGEMENT DECISIONS - EXAMPLE RECORD | 1800 |
|---|---|---|

MANAGEMENT DECISION RECORD

REPORTING INFORMATION ─1802

*NOTE: All Reporting Information hierarchy and organization fields are marked as "required"; however, the hierarchy fields that are not applicable to the <project> will remain blank.*

- ✓ Initiative:
- ✓ Program:
- ✓ Project:
- ✓ Sub-project:
- ✓ Participating LOB(s) / SU(s):
- ✓ Business Unit(s):

DECISION INFORMATION ─1804

- ✓ Decision Title:
- ✓ Decision Description:
- ✓ Decision Date:
- ✓ Person Responsible:
- Type:
- Additional Comments:
- Attachments:

IMPACT INFORMATION ─1806

- Impacted Project:
- Impacted Team:
- Additional Impacts:
- Additional Impacts Description:

FIG. 18

| 11 MEETINGS - EXAMPLE RECORD | 1900 |

MEETING RECORD

REPORTING INFORMATION — 1902

*NOTE: All Reporting Information hierarchy and organization fields are marked as "required"; however, the hierarchy fields that are not applicable to the <project> will remain blank.*

| | |
|---|---|
| ✓ Initiative: | ✓ Participating LOB(s) / SU(s): |
| ✓ Program: | ✓ Business Unit(s): |
| ✓ Project: | |
| ✓ Sub-project: | |

MEETING INFORMATION — 1904

| | |
|---|---|
| ✓ Purpose: | Team: |
| ✓ Date: | Primary Location: |
| ✓ Start Date: | Other Locations: |
| ✓ End Date: | Call-in Number: |
| ✓ Time Zone: | Access Code: |
| Participants: | ✓ Contact Name: |
| Project: | ✓ Contact Phone: |

Agenda:

MEETING RESULTS — 1906

Phase:
Participants:
Attach Minutes Here:
Minutes:
Next Steps:

FIG. 19

| 13 | ACTION ITEMS - EXAMPLE RECORD | 2000 |
|---|---|---|

ACTION ITEM RECORD

REPORTING INFORMATION —2002

*NOTE: All Reporting Information hierarchy and organization fields are marked as "required"; however, the hierarchy fields that are not applicable to the <project> will remain blank.*

| ✓ Initiative: | ✓ Participating LOB(s) / SU(s): |
|---|---|
| ✓ Program: | ✓ Business Unit(s): |
| ✓ Project: | |
| ✓ Sub-project: | |

SOURCE OF ACTION ITEM —2004

| ✓ Section: |
|---|
| Phase: |

ACTION ITEM INFORMATION —2006

| ✓ Action Item Number: | Priority (Choose One): |
|---|---|
| Date Logged: | q  High |
| ✓ Assigned To: | q  Medium |
| Team: | q  Low |
| ✓ Description: | ✓ Status (Choose One): |
| Due Date: | q  Open |
| Actual Completion Date: | q  Closed |
| | q  Hold |

| Comments: |
|---|
| Attachments: |

FIG. 20

| 14 FINANCIALS - NEW SECTION - EXAMPLE RECORD | | |
|---|---|---|
| \multicolumn{3}{|c|}{FINANCIAL RECORD} | | |

2100

| REPORTING INFORMATION — 2102 |
|---|
| NOTE: All Reporting Information hierarchy and organization fields are marked as "required"; however, the hierarchy fields that are not applicable to the <project> will remain blank. |

| ✓ Initiative: | ✓ Participating LOB(s) / SU(s): |
|---|---|
| ✓ Program: | ✓ Business Unit(s): |
| ✓ Project: | |
| ✓ Sub-project: | |

OVERALL — 2104

| BUDGET | RESOURCE INFORMATION | COST & SCHEDULE |
|---|---|---|
| At Budget?: (Yes/No) | Planned Headcount (#): | Planning Estimate ($): |
| If "No", then Comment: | Planned Contractor Headcount (#): | Planning Launch Date: |
| Budget: | Actual Headcount (#): | Commitment Estimate ($): |
| | Actual Contractor Headcount (#): | Commitment Launch Date: |
| | | Current Estimate ($): |
| | | Current Launch Date: |
| Attachment(s): | | |

| Actual: |
|---|
| Remaining: |
| Variance: |

TRACKING INFORMATION — 2106

| Major Project Code: | Cost Center Number: |
|---|---|
| Sub-project Code: | Cost Center Name: |
| Billing LOB: | CRR Number: |
| Billing Business Unit: | CERP: |
| Primary Service Request: | Change Management Number: |
| Other Service Requests: | |

LOB 1 — 2108

| BUDGET | RESOURCE INFORMATION | COST & SCHEDULE |
|---|---|---|
| At Budget?: (Yes/No) | Planned Headcount (#): | Planning Estimate ($): |
| If "No", then Comment: | Planned Contractor Headcount (#): | Planning Launch Date: |
| Budget: | Actual Headcount (#): | Commitment Estimate ($): |
| | Actual Contractor Headcount (#): | Commitment Launch Date: |
| | | Current Estimate ($): |
| | | Current Launch Date: |
| Attachment(s): | | |

| Actual: |
|---|
| Remaining: |
| Variance: |

FIG. 21

SYSTEM AND METHOD FOR NETWORK-BASED PROJECT MANAGEMENT

FIELD OF THE INVENTION

The present invention relates to the field of project management, and more particularly to network-enabled project management for coordinating different levels of an organization.

BACKGROUND OF THE INVENTION

When an entity, such as a business, academic, government or other organization undertakes a large project, it is desirable to have a system to manage information about the project. For example, it may be desirable to accumulate schedules, costs, and other information related to the project and to produce reports from the project-related information.

Although some project management systems are available, existing packages are limited in scope and flexibility. For example, the databases storing the project information often have limited storage or other capacities, so that the reports that may be generated using the project management systems are correspondingly limited.

Further, operationally speaking, each department, line of business or other unit of an organization may employ its own project management system. The project management system used by one unit may not be compatible with the project management system of another unit or a general project management system used by the business, or by suppliers and other vendors. Sharing data, such as schedules or lists of personnel, between levels of the company or other organization may therefore be difficult. Setting a consistent security policy across all levels of the company or other organization may also be difficult or impossible. Other problems exist.

SUMMARY OF THE INVENTION

The invention overcoming these and other problems in the art relates in one regard to a system and method for managing project information over a network. The inventive system may include a project information database associated with the network, and a project information management tool. The project information database may store information associated with a project being carried out by a corporate or other organization having at least one sub-entity, such as a subsidiary, division, foreign unit or other unit. The project information management tool may include a project information module to manage the information associated with the project, and share information using a set of collaborative management tools. These tools may include at least one cross-entity module and other elements that manage entity-specific information, database access and other resources, and coordinate those resources in the overall database of the information associated with the project.

BRIEF DESCRIPTION OF THE DRAWINGS

FIG. 7 is a screen shot illustrating one embodiment of a project information record generated by a project information module;

FIG. 8 is a screen shot illustrating one embodiment of an initiative information record generated by the project information module;

FIG. 10 is a screen shot illustrating one embodiment of a milestone record generated by a milestone module of FIG. 4;

FIG. 11 is a screen shot illustrating one embodiment of an issue record generated by an issue module of FIG. 4;

FIG. 12 is a screen shot illustrating one embodiment of a change control record generated by the change control module of FIG. 4;

FIG. 13 is a screen shot illustrating one embodiment of a document record generated by a documents module of FIG. 4;

FIG. 14 is a screen shot of one embodiment of a project status report generated by a project status report module of FIG. 4;

FIG. 15 is a screen shot illustrating one embodiment of a delivery process status section generated by a project status reports module of FIG. 4;

FIG. 16 is a screen shot illustrating one embodiment of a team member status report generated by a team member status module of FIG. 4;

FIG. 17 is a screen shot illustrating a contact record generated by a contact module of FIG. 4;

FIG. 18 is a screen shot illustrating one embodiment of a management decision record generated by a management decisions module of FIG. 4;

FIG. 19 is a screen shot illustrating one embodiment of a meeting record generated by a meetings module of FIG. 4;

FIG. 20 is a screen shot illustrating one embodiment of an action item record generated by an action items module of FIG. 4;

FIG. 21 is a screen shot illustrating one embodiment of a financial record generated by a financials module of FIG. 4;

DETAILED DESCRIPTION OF PREFERRED EMBODIMENTS

Figure 1:
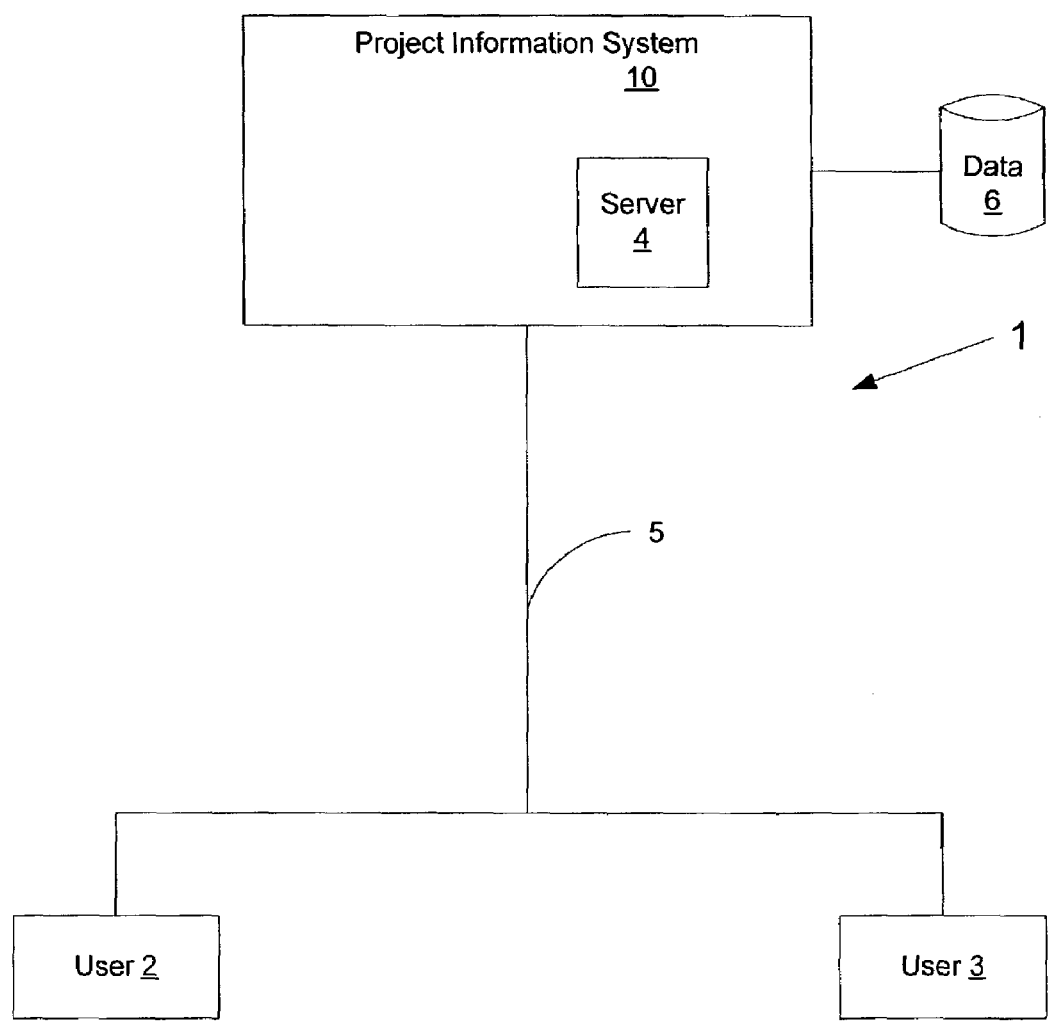
FIG. 1 is a block diagram illustrating a system including a project information system according to an embodiment of the present invention.

FIG. 1 is a block diagram illustrating one embodiment of an overall system including a project information system, according to an embodiment of the invention. System 1 may include a project information system ("PIS") 10, network 5 and users 2 and 3. PIS 10 may include a server 4 and database 6.

The server 4 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Although the database 6 is shown to be located outside project information system ("PIS") 10, database 6 may reside within PIS 10 in other embodiments. The database 6 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

PIS 10 and users 2 and 3 may communicate to each other through network 5. In one embodiment, PIS 10 may reside on one or both of a user system 2, 3. Although only two user systems are shown, in practice as many systems as needed or desired maybe used.

In one embodiment, when a user 2,3 accesses project information system 10, the functions, displays and records to which the user 2,3 has access may be determined by the status of the user using user system 2,3.

The communications link 5 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an A™ (Asynchronous Transfer Mode) connection, or an FDDI (Fiber Distributed Data Interface) or CDDI (Copper Distributed Data Interface) connection. Communications link 5 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 5 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Users 1, 2 may communicate to PIS 10 through client systems. The client systems may be or include, for instance, a personal computer running the Microsoft Windows™ 95, 98, Millenium™, NT™, or 2000, Windows CE™, PalmOS™, Unix, Linux, Solaris™, OS/2™, BeOS™, MacOS™ or other operating system or platform. The client systems may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. The client systems may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. The client systems may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

The client systems and PIS 10 may communicate with each other using network-enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMWL), Wireless Markup Language (WML), Java™, Java™ Beans, Enterprise Java™ Beans, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 2:
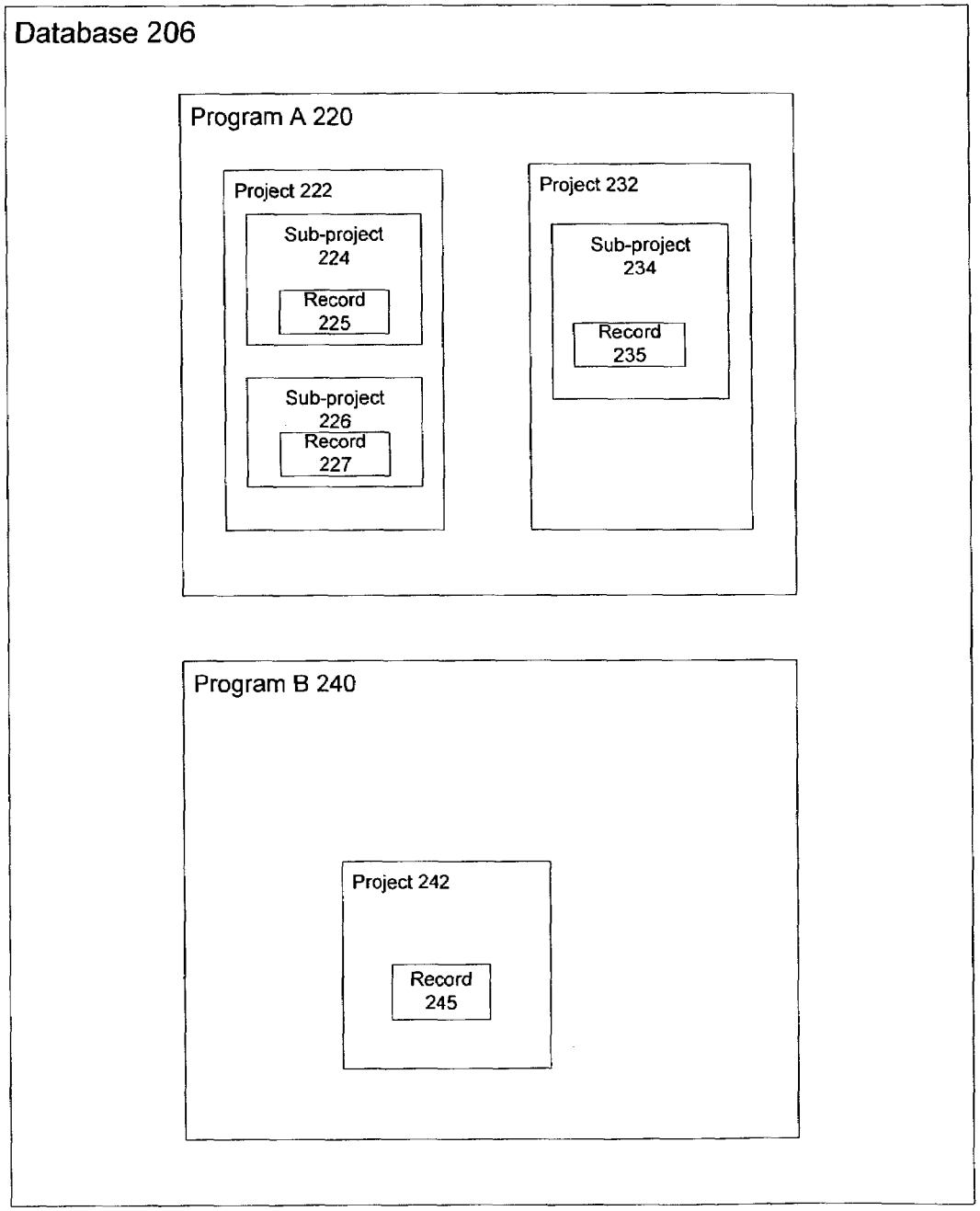
FIG. 2 is a blocked diagram illustrating one embodiment of a database shown in FIG. 1.

FIG. 2 is a blocked diagram illustrating an embodiment of the database of FIG. 1. Projects in the PIS 10 may be classified and organized according to larger programs to which the projects belong. In one embodiment, database 206 may include at least program file, such as program A 220 and program B 240. Each of program A 220 and program B 240 may include projects, such as 222, 232, 242. Each of the projects 222, 232, 242 may further include sub-projects such as sub-projects 224, 226, 234 in a relational project hierarchy.

In the example shown, program A includes projects 222 and 232 and program B 240 includes project 242. Project 222 may be further sub-divided into sub-projects 224 and 226. In one embodiment, a project may include only one sub-project. For example, project 232 may include only sub-project 234. Although only two programs 220 and 240, are shown, database 206 may include any number of programs. The database 206 may include as many programs as required or desired. The projects 222, 232, 242 and sub-projects 224, 226, 234 are shown for illustrative purposes only. In practice, programs 220, 240 may include any number of projects and sub-projects.

In one embodiment, each project 222, 232, 242 may include records 225, 227, 235, 245. If a project has sub-projects, the records may be a part of the sub-project or alternatively may be part of the project or program outside of the sub-project. For example, the record 225 is a part of sub-project 224 of project 222 of program A. Record 227 is a part of sub-project 226 and record 235 is a part of sub-project 234. If the project such as 242 does not include a sub-project, the record maybe part of the project. For example, record 245 would be considered to be a part of project 242.

Figure 3:
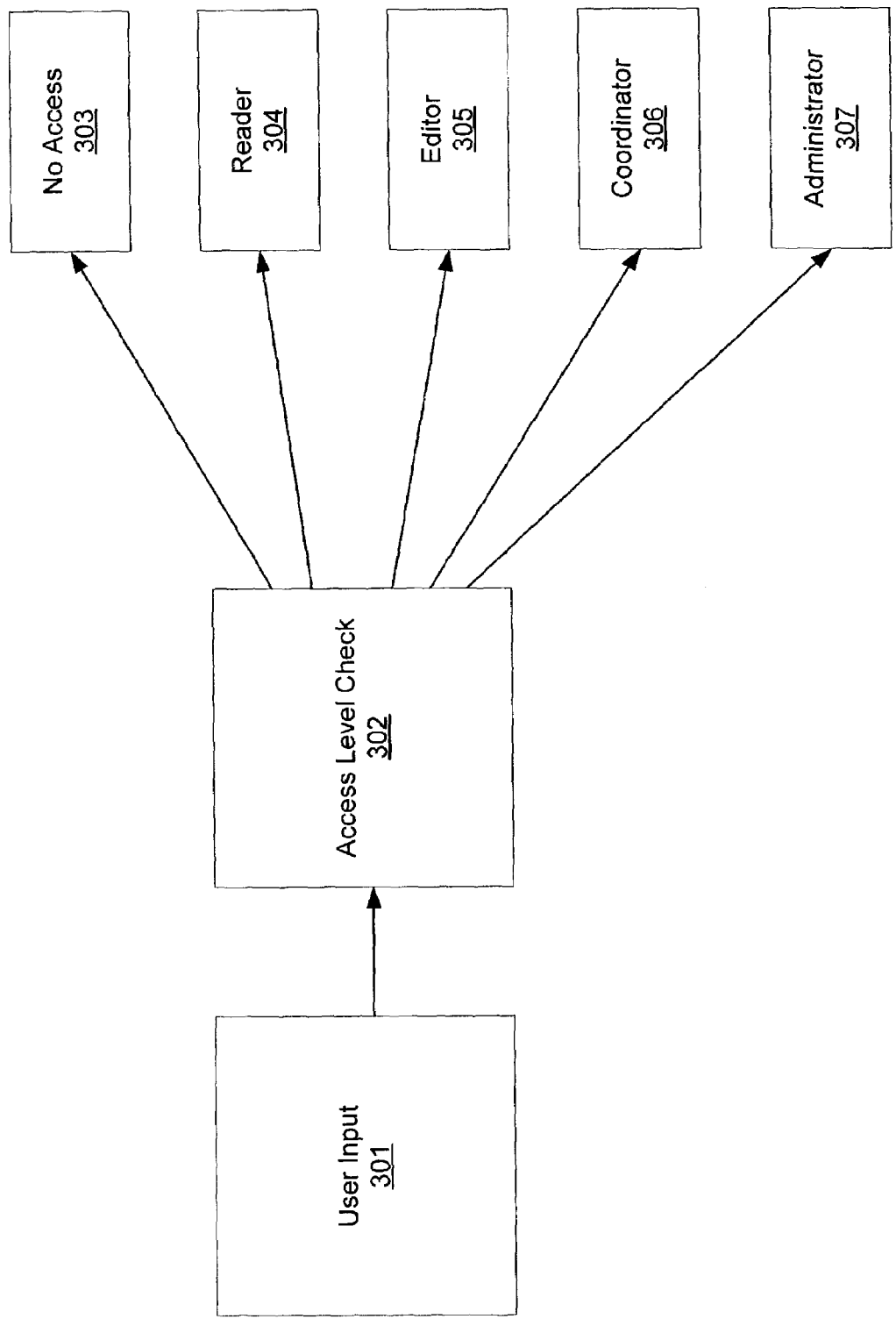
FIG. 3 is a flow diagram illustrating one embodiment of a method for providing access to a user by a project information system.

FIG. 3 is a flow diagram illustrating one embodiment of a method providing a user with access to the PIS 10. At step 301, a user may input information indicating the user's status or access level. At step 302, PIS 10 may check the access level of the user based on the users input 301. If the user's input indicates that the user does not authorize to that level of access, the PIS 10 may return a message indicating that the user does not have access or show the user a generic screen that does not allow the user to access any restricted or confidential information regarding a program 220, 240 or project 222, 232, 242.

If the user input 301 indicates that the user has a reader level access, the PIS 10 will allow the user to access the reader level functionality, displays and records. Reader level functionality may include the ability to perform searches, save searches, access policies and procedures documents, access section-specific PIS 10 help and open online displays.

The policies and procedures and documents for each program may be stored at the program level. The document may be accessed from any area of the PIS 10 hierarchy, however.

The reader-accessed 304 functionality may include the ability to open a record in read mode, open attachments, identify attachments with an icon such as one indicating a spreadsheet or text file, and export records to outside applications. For example, a user having a reader level access may export a document to a Microsoft Excel™ document or other spreadsheet document.

The user having the reader level access may display only those projects to which the user has excess. For example, at step 302, the PIS 10 may also check to see to which projects the user has access. Thus, the user will only have reader functionality for the projects to which the user has been given access. In one embodiment, the user having a reader level access status may also have the ability to select and save limited number of projects the user wants to display.

In viewing records, the user having a reader-level access status may access records, see previous record, see next records, print records and mail records. In one embodiment, a uniform resource locator ("URL") link to a PIS 10 record may be included with an email. The user having record level access status may send a record copy with attachments as well as the URL link so that the user may access the original document in PIS 10.

The user may also have access to record-specific PIS 10 help. The user may also be able to expand sections and collapse section. In one embodiment, each record may have an edit history at the bottom of each record. The edit history may be entitled "edit history" or "edit trail" or any other appropriate heading. The edit history or trail section may include a column called "type". The type column will reflect the type of change being made in the document. List of type of change may include name change, deleted records, archive records, moved records and modified records. Name changes may include name changes to the program, the project, or a sub-project name and the affected related records 225, 227, 235, 245.

If the user access level is an editor access, PIS 10 may provide the user with editor access at step 305. Editor access may include all of the functionality of reader access, and form a superset thereof. With regard to on line displays, editor access may include creating a record based on a program, project, or sub-project. The editor may create a record in any section in the PIS 10 except the archive section or project information section or project information section. The editor may also open a record in edit mode (except in the archive section), move record(s) to the archive section, and remove record(s) from a section to mark the record(s) for deletion (except in the archive section). With regard to records, the editor may modify previously record(s). The editor may not be able to edit records in the archive section or modify project name or participating line of business/sub-unit fields in the project information records described below. The editor may not be able to edit fields in the tracking information section. The editor may also save modified records.

If the user has a coordinator-level access, at step 306, the PIS 10 will present the user with coordinator level access. The coordinator will have the same functionality as reader and editor. The coordinator may also be allowed to edit fields in the tracking information section, as described below, and create program, project, and sub-project records.

If the user-access level is an administrator access level, at step 307 PIS 10 will present the user with administrator level access at step 307. Administrator-level access may include all of the functionality of reader level access 304, editor-level access 305 and coordinator-level access 306. Additional administrator-level access privileges will be described below.

Figure 4:
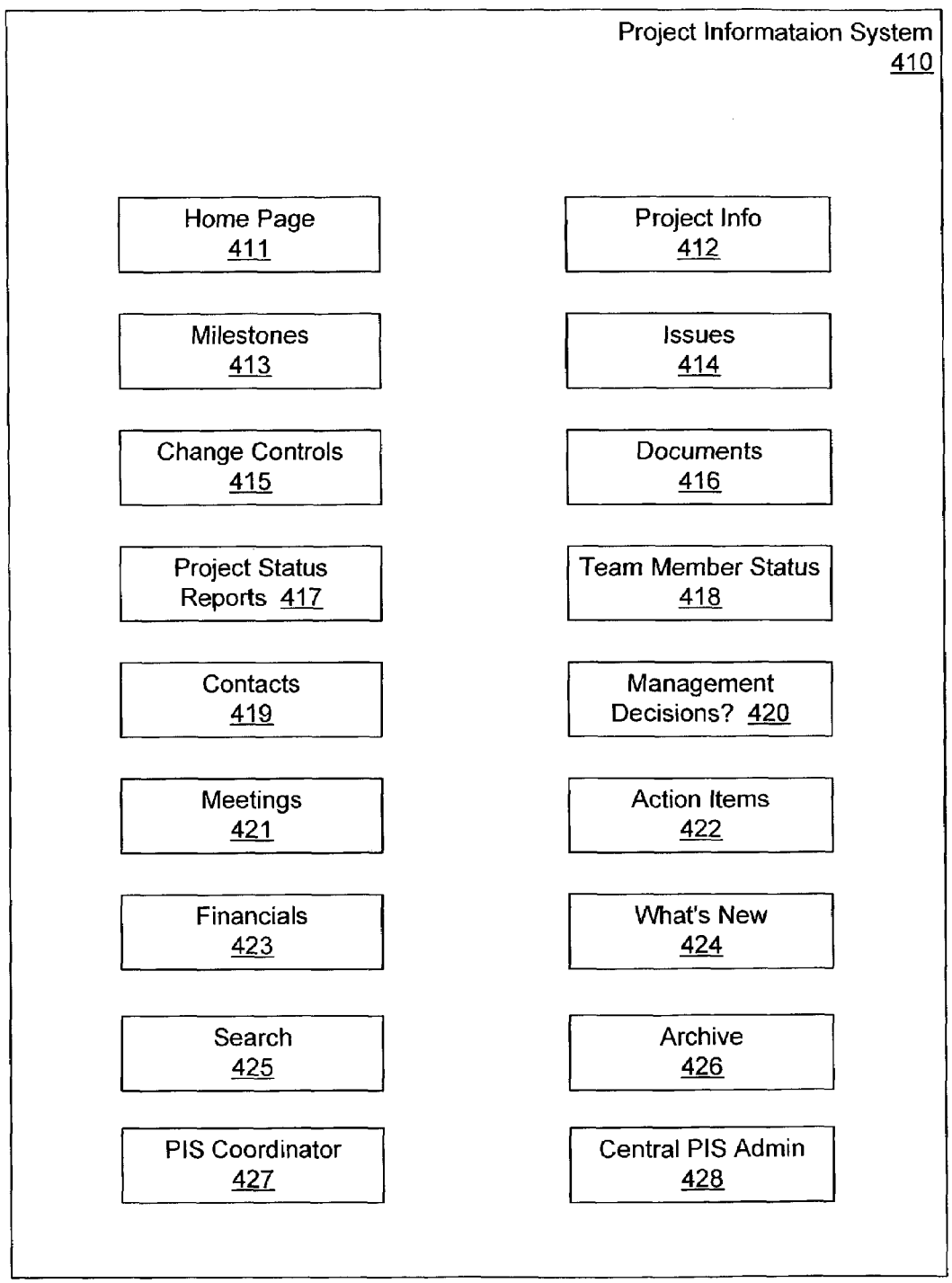
FIG. 4 is a block diagram illustrating one embodiment of the project information system of FIG. 1.

FIG. 4 is a block diagram illustrating one embodiment of the project information system of FIG. 1. Project information system 410 may include a plurality of components 411–428 for managing a project. Project information system 410 may include a home page 411 and a project information section 412. The PIS 410 may also include a milestone module 413, and issues module 414, a change control module 415, a documents module 416, a project status report module 417, team member status report module 418, contact module 419, management decisions module 420, meetings module 421, and action items module 422. The PIS 410 may also include financials module 423, a "what's new" module 424, search module 425, archive module 426, PIS coordinator module 427 and central PIS administrator module. The modules will be described in more detail below with reference to FIGS. 6–21. Each module may include the ability to generate online displays and records related to the module, among other functions.

Figure 5:
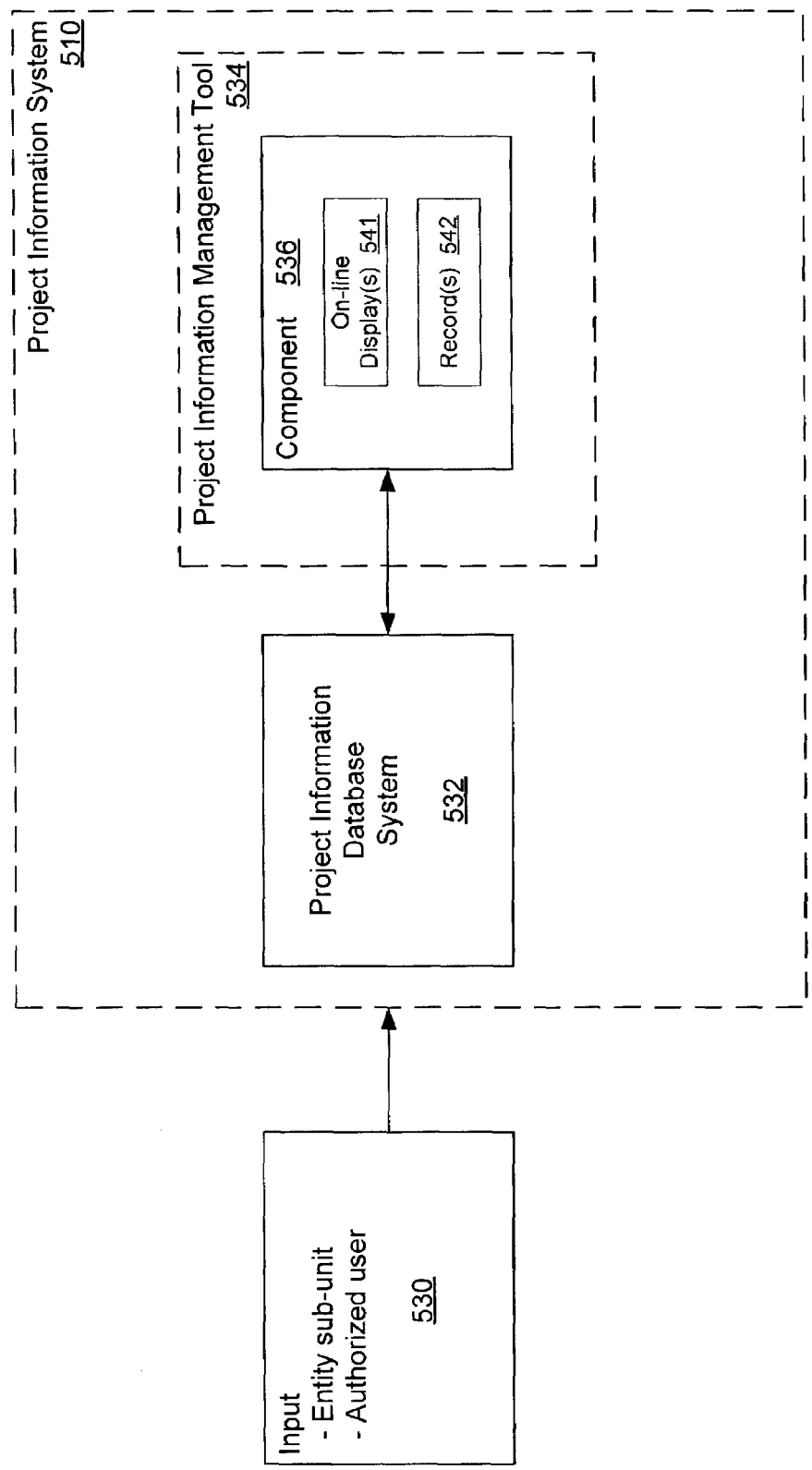
FIG. 5 is a block diagram illustrating a section module of a project information system according to the present invention.

FIG. 5 is a block diagram illustrating a section module of the PIS of FIG. 1. FIG. 5 illustrates a PIS 510 including project information database system 532 and a project information management tool 534. Information regarding a project may be input through input block 530 into project information database system 532. Input of information at block 530 may include information input by a sub unit of an entity, such as a line of business or other sub units of a corporation. The input may also be from any other authorized user of the PIS 510.

Project information data base system 532 may store and/or organize the information input at input block 530. The information in project information data base 532 may be organized according to component, such as components 411–428 of FIG. 4. Each of the components of 411–428 may be a part of project information management tool 534.

A component 536 is shown to be a part of project information management tool 534. Component 536 is representative of a component 411–428 of the PIS 410, 510. Component 536 includes an online display component 541 and a record component 542. Online display component 541 may be used to easily find documents and display quick online reports. The online display component 541 may also be used to print formatted reports quickly. Records component 542 may include documents created to capture different kind of information.

The user accessing a component 536 may be presented with online displays 541 and access to other online displays 541 as well as access to records 542. When a user accesses an online display, project information management tool 534 will retrieve the information from project information database system 532. In one embodiment, the online displays 541 and records 542 may be pre-formatted and stored in project information database system 532. In another embodiment, the online displays 541 and record 542 may be dynamically generated based on input from a user at a user system 2,3. Thus, online displays 541 and records 542 may be customized based on user requirements or desires.

Figure 6:
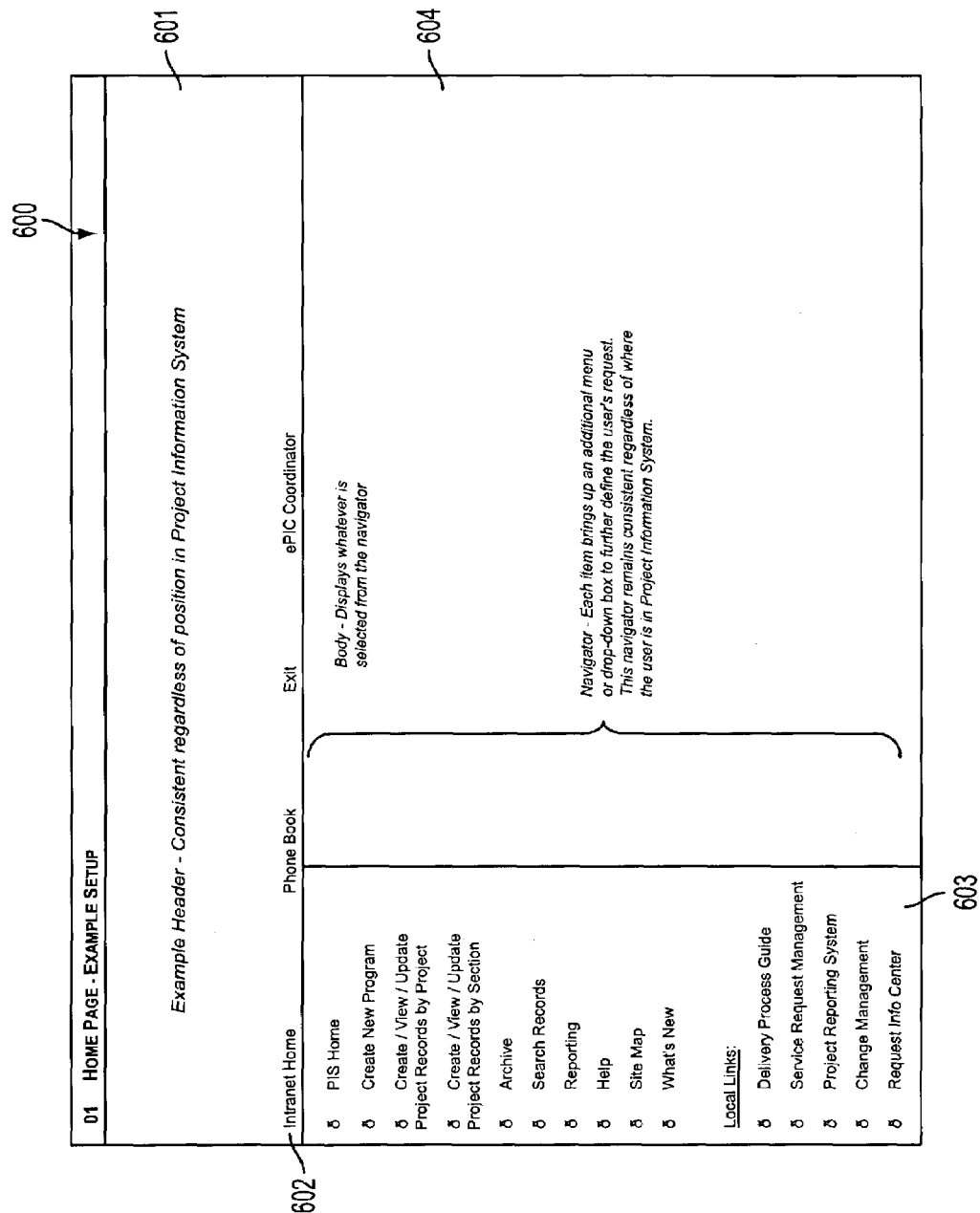
FIG. 6 is a screen shot of a sample home page display generated by the home page module of FIG. 4.

FIG. 6 is a screen shot of a sample home page display generated by the home page module 411 of FIG. 4. As shown in FIG. 6, the home page module may display a home page 600 including a header 601, links-board 602 and navigator

603. Links-board 602 may include links to the intra-net home page of the network 5, a phone book link, an exit link and a PIS coordinator link. The PIS coordinator link may allow users with a coordinator level access status or above to access functionality available only to coordinators and central administrators.

Navigator 603 may include links to the project information system home page, a link to create a new program, a link to create/view/update project by a project, a link to create/view/update project records by a section, a link to the archive module 426, a link to a search records module 425, a link to a reporting section, a link to help section, a link to a site map, and a link to the what's new module 424. The body of the home page 604 may display whatever is selected from the navigator 603. The items of navigator 603 may be used to bring up additional menus or drop down boxes to further define the users request. The navigator 603 may remain on screen regardless of where the user is in the project information system 410.

The functionality available in the home page module 411 may be defined in terms of access status. Users with a reader access status may access an intranet phone book, the delivery process guide, a service request management application, a change management application, a project information system help section, the what's new module 422, search module 425, archive module 426 and any of the report modules. In one embodiment, the reader may also be given access to financials module 423.

The reader functionality may also include access to project documents. A reader may access project documents by selecting a link. For example, as shown in FIG. 6, a reader may access project documents by selecting either "create/view/update project record by project" or by selecting "create/view/update project records by section". The project records by project selection will allow the user to choose one or multiple program(s), project(s), or sub-project(s) and display all project records under their appropriate hierarchy. The selection of project records by section will allow the user to choose one or multiple section(s) 411–423 for one or more project(s) 222, 232, 242 to display records by section.

A user with PIS coordinator access status may access PIS coordinator functions available through the PIS coordinator link of links board 602. A user with central administrator status may access the PIS coordinator functions linked to see central administrator functions as well as PIS coordinator functions. All functionality that is exclusive to central administrators may be hidden from PIS coordinators when the PIS coordinator link is selected by a user with a PIS coordinator status. The central administrator may be able to modify the body of the home page including modifying the welcome message, who to call for support, who to call for access and the editor's guide. In one embodiment, the editor's guide may be an attachment to or embedded (OLE or otherwise) document in the home page.

FIG. 7 is a screen shot illustrating one embodiment of a project information record generated by a project information module 412. Project information record 700 may include a general project information section 702, a tracking information section 704, and a line of business or subunit specific section 706. Although only one line of business/business subunit section 706 is illustrated, there may be a plurality of line of business subunit sections 706, depending on the number of the line of business of sub units involved in a project.

A user having a coordinator status may have the functionality to create programs, create projects associated with the programs, create sub projects associated with a project and realign project hierarchy. Realigning project hierarchy may include moving all documents as one unit. Creating a program may include assigning editors as well as other PIS 10 coordinators at the program level. The coordinator may also be able to move project information records to the archive section 426 after all related project records are archived. The coordinator may further archive selected project(s) with all related project records at any level or delete selected project(s) with all related project records at a new level.

The coordinator may further create initiative information records. The central administrator may maintain a list of initiatives and assign access to create the initiative information record, described in more detail below with reference to FIG. 8.

With reference to records 542 of the project information module 412, an editor may have the additional functionality of posting and editing delivery process dates and risks in grids that are displayed in the project information record. The editor may select a phase name in a delivery process grid to bring up fields for the editor to complete. The fields the brought up may include dates and risks. In one embodiment, once the date is saved, the data may be displayed in delivery process and risk grids in the project information record. Phase date and risk may be similarly edited. The editor may also hide or show individual phases within the delivery process and risks grid.

A user having coordinator status may complete all fields required to be completed for the creation of a program, project or sub-project. The fields to be completed may include required fields of the general information section 702 and optional fields of line of business/sub unit section 706. In the general information section, the coordinator may complete the fields of program name, project name or sub project name, executive sponsor, program manager, overall project manager, participating line of businesses or sub unit(s) and project objective/description.

The fields of the LOB/SU section 706 may vary with the LOB/SU. For example if one of the LOBs is retail information technology ("IT"), the fields the coordinator may fill out may include initiative, objective and business unit. For a retail line of business, the field that a coordinator may include is "business unit". In one embodiment, if the entity performing the project is a financial surfaces entity or another entity having corporate administrative services as a supporting unit, the project information record 700 may include, for example, a corporate administrative services (a LOB) information section 708. The coordinator may have the functionality to complete the fields in the CAS information section 708. These fields may include project name, project manager, business unit, project objective/description, start date and cost center.

In one embodiment, the product information record may include, for example, a national enterprise operations ("NEO") information section as a supporting unit section 706. The coordinator may have the functionality to complete the fields of project status, schedule start date and schedule end date in the NEO information section. Coordinator may have the functionality to select sections to be displayed in each program project, or sub project that are available within PIS 10. The coordinator may choose to show or hide the selectable sections. The coordinator may further modify all editable fields and rename programs, projects or sub projects.

The coordinator may determine access for a program or project. This access will establish default access created for all documents created under the program or project. If a coordinator removes access at the program or project levels, access for all records created for the program or project, respectively, will also be removed.

The coordinator may add a section in the general project information section 702. The added section may include the fields of initiative, program, project, sub project and participating (LOB/SU). The initiative may be chosen by the coordinator at the program level. The field may be editable at the program level and viewable at all other levels. The initiative field may be left blank as a default selection. The initiative field may be created so that users may generate initiative level status reports as well as other initiative level reports.

The coordinator may type in the name of the program at the program level, the name of the project at the project level and the name of the sub project at the sub project level. The program name may be editable at the program level and viewable at all other levels. The project name may be editable at the project level and viewable at the program and sub project level. The administrator may establish a master list of participating LOB(s)/SU(s) and enter this list into the participating LOB/SU field.

The values may inherit from the program level to the project and from the project to sub project levels. The coordinator may adjust the values in each level below program according to what is needed. The coordinator may have the authority to remove but not add values in each level where the coordinator adjusts the values of the participating LOB/SU field. LOBs may be added only at the program level.

The coordinator may also add an ebusiness ("Ebiz") field for an Enterprise Project Delivery (EPD) report. The Ebiz field may be hard coded and optional.

Each time a project information record is created and saved, a financials record may be automatically created for that project.

The coordinator may also complete an initiative record as shown in FIG. 8. FIG. 8 is a screen shot illustrating one embodiment of an initiative record. The coordinator may complete the general information field 802 of the initiative information record 800. The required fields of the general information section 802 may include initiative name and LOB/SU owner. The initiative name may be selected from a drop down list. The coordinator may also select a single value from a drop down list for the LOB/SU owner.

The coordinator may complete text fields in the general information section 802 which may include description, benefit and strategy. The description field may describe the initiative. The benefit field may describe the benefit of completing the initiative. The strategy field may describe the high-level of strategy for completing the initiative.

A user having a central administrator status may maintain values for initiative indicator key words fields and create additional LOB specific sections as needed. A central administrator may add new sections. The new sections may include the fields of project manager, business unit, size or status.

Figure 9:
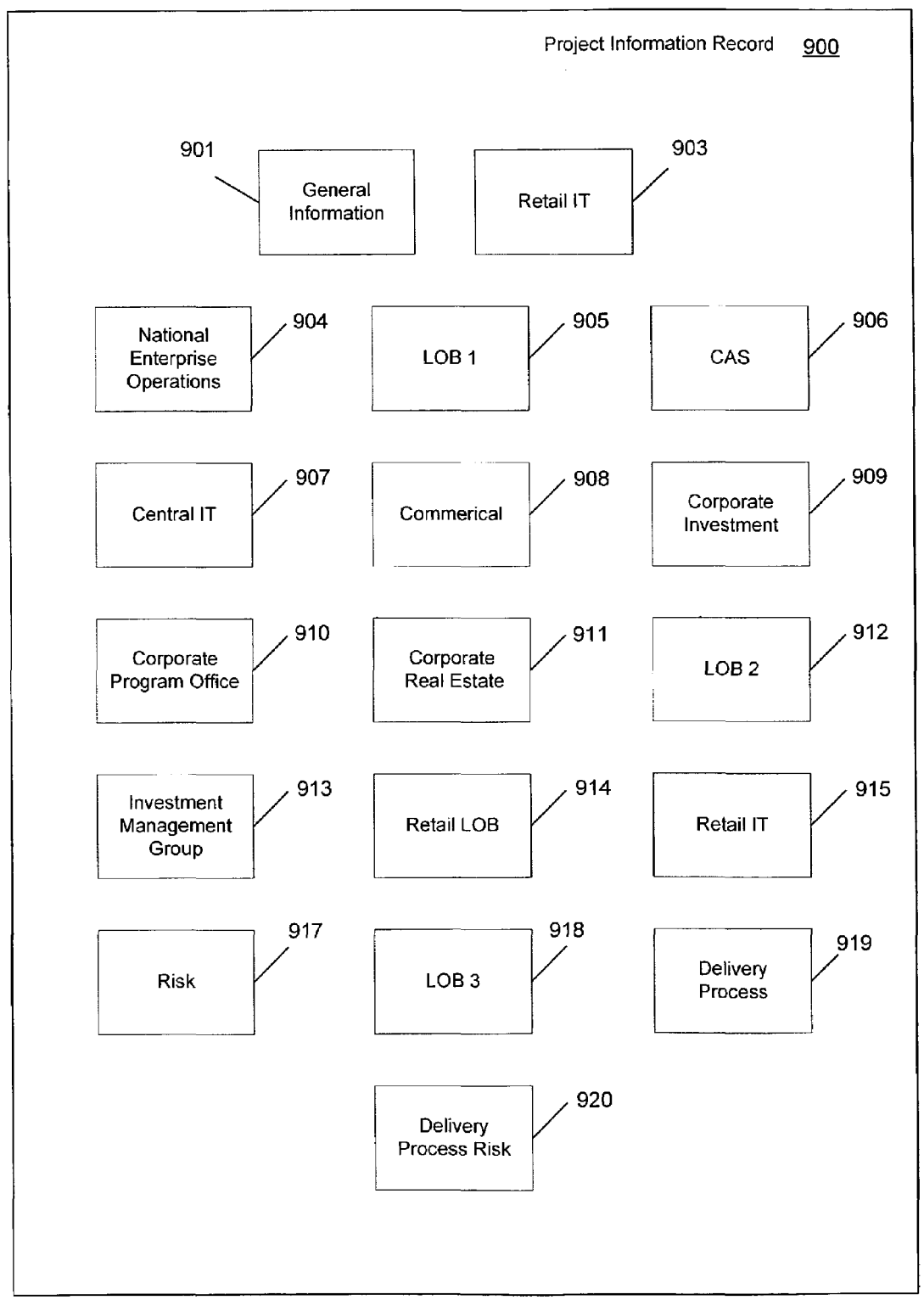
FIG. 9 is a block diagram illustrating the organization of project information records.

FIG. 9 is a block diagram illustrating the organization of the project information record of FIG. 7. The project information record 900 may include a plurality of sub records including a general information sub record at 901 and other sub records 902–918 representing a line of business or supporting unit.

The project information record of FIG. 9 illustrates an example of a project information record which may be used by a financial services entity. The financial services entities project information record 900 includes a general information record 901, retail IT 903, national enterprise operations 904, CAS information 906, central IT 907, commercial information 908, corporate investment 909, corporate program office 910, corporate real estate 911, investment management group 913, retail line of business 914, retail IT 915, risk information 917, delivery process 919 and delivery process risk 920. The project information record also includes line of business sub records 905, 912, and 918. The general information section 901 of the project information record may include an executive sponsor field and program manager field established at the program level. Each LOB section may also include a business unit field tied to an associated LOB/SU so that a business unit may be selected if the associated LOB/SU has been selected. Removing a LOB/SU may also remove all associated business units. Business units of the project and sub project levels may be removed but not added.

A project may inherit fields from the program level and a sub project may inherit fields from the project level. All inherited fields may be editable. In one embodiment, the project and sub project may inherit the fields of executive sponsor, program manager, over all project manager, technical officer, business owner, finance owner, technology owner, participating LOB/SU start date, revised start date, end date, revised end date, project objective/description and benefit. Modification of the inherited fields however may not cause re-inheritance except for the participating LOB/SU field. When a coordinator creates a project record, the LOB/SU information may cascade from the program record to the newly created project record and from the project record to the sub project record. If a coordinator edits a program record to add or delete a LOB/SU, the pick list of LOB/SU values will update for the lower levels but will not automatically change the LOB/SU field in the project or sub project record. The coordinator may edit the project or sub project record to change the field.

The key word fields in the general information section may include any chosen field such as, for example, participating LOB/SU, initiative, executive sponsor, program manager, overall program manager, technical officer, business owner, finance owner, technology owner, overall status and e-business. The key word field may also include "on time?" and "uses DP framework?".

Some or all of the key word fields may include hard-coded radio buttons. In one embodiment, the key word fields may include hard-coded radio buttons having the values yes or no. Other key word fields may include drop-down lists. In one embodiment, some or all of the drop-down list may be maintained by central administrator. The e-business field may also include hard coded radio buttons including yes or no values to indicate whether the project is an electronic business project. In one embodiment if no is selected in the "on time?" field, a required text field labeled "if no, then comment" may be displayed for the user to complete.

The fields in the other sub records 903–920 may be inherited or selected as described with reference to the general information subrecord 901. The central administrator or other authorized user may determine which fields are inherited and which fields are selectable. In one embodiment, some of the fields may be designed to be editable even if inherited. Each record 700, 800 of the project information system 10 may include a record access and edit history 820. The record access and edit history section may include a field for name of user, date/time and type of change made in the document.

FIG. 10 is a screen shot illustrating one embodiment of a milestones record 1000 generated by the milestones module 413. Milestones module 413 may be used to track milestones. Milestone record 1000 may include sub records such as, for example, reporting information 1002, dates 1004, tracking information 1006 and status information 1008.

The online displays may provide the reader with the functionality of displaying default columns. The default columns may include milestone name or sort, risk, status, percent complete, start date, end date and owner. The start date and end date may pull either the original or revised date. For an editor, the functionality may include creating a milestone based on a program, project or sub project. The editor may also complete required fields of the record 1000. The required fields may include milestone name, status and risk.

In the dates sub records 1004, the original date and end date may not be editable after the first entry and save. In one embodiment, the original end date may be a required field. In the reporting information 1002, the phase field may include a drop-down box of all phases in which the user may choose the appropriate phase. The percent complete fields under status information 1008 may automatically update to 100% once the status is marked complete. The key word fields of the milestones record 413 may include the fields of phase, status, risk, milestone type, owner and team owner. The key word fields may include drop down lists or hard coded radio buttons. The drop down list may be maintained by central administrator.

FIG. 11 is a screen shot illustrating one embodiment of an issue record generated by issue module 414. Issue record 1100 may include reporting information sub record 1102, issue description sub record 1104, status and severity sub record 1106, impacts sub record 1108 and resolution sub record 1110. The reader functionality in online displays of the issue modules 414 may include viewing a default display including issue number, issue title, status, severity, risk, target date and who the issue is assigned to. Editor functionality for online displays may include creating issues based on a program, project or sub project, creating a risk matrix and problem solving matrix, generating a issue log and modifying predetermined editor modifiable fields for an issue. The predetermined editor modifiable fields may include status, severity, risk, problem solving step.

The editor functionality may further include completing required fields of the issue record. The required fields may include, issue number, issue date, issue description, issue title, status, severity and risk. The key word fields in the issue record may include issue category, phase, raised by, status, severity, risk, problem solving step, project teams impacted, impacts, assigned to and assigned team. These fields may be populated by a selection of a value from a drop down list or hard coded radio buttons. A drop down lists may be maintained by the coordinator for each program hierarchy or central administrator.

The issue number may pre-populate with a sequential number within a program, project or sub project. The issue number field may begin with 1 and increase in increments of one within each program, project or sub project. The issue date may pre-populate with the current date. The issue date may also be editable. If status is marked closed, the actual date may appear as a required field. The actual date may pre-populate with current date, but may be editable.

The resolution field may have the ability to capture name and date of each author each time a new entry is made in the resolution field for each issue. The resolution field may be required when the status is marked closed. An issues update field 1112 may be used to record the name and date of each author each time a new comment is made on an issue. An impacts field in the impacts section 1108 may include a list of categories that may be check as being impacted. The list of categories may include issue, scope, schedule, resources, financial and other.

The issue record 1100 may have the ability to reference the phase of the project which is impacted by the issue, as shown in issue description field 1104. An automatic e-mail may be sent to the person assigned to the issue after the first save of an issue or after the "assigned to" field has been changed.

FIG. 12 is a screen shot illustrating one embodiment of a change control record generated by change control module 415. The change control record 1200 may include a reporting information section 1202, an identification section 1204, impact section 1206, and action taken action 1208.

The reader functionality for online displays for the change controls module 415 may include viewing a default display. The default display may include change control number, change control name, action taken and priority. The editor functionality for the online displays may include creating change control based on program, project, or sub-project, open change control record and edit mode.

The editor functionality for records may include completing required fields for the change control record. The required fields may include change control number, submitted by, change control name, date submitted. The change control number may pre-populate with a sequential number within a program, project, or sub-project. The number may begin with 1 and increase in increments of one within each program, project or sub-project. The change control number may not be editable.

The key word fields in the change control records may include submitted by, project manager, related request, priority, impact assessment conducted by, action taken. The key word fields may include drop down name lists or hard coded radio buttons. If a key word field is populated by drop down name list, multiple values may be allowed for that field. The drop down list may be administered by coordinator, editor or central administrator as determined by the central administrator or other authorized user.

The submitted name field may pre-populate with the name of the person creating the change control. The dates submitted field may be pre-populated with the current date. The action taken sub record may have additional fields that appear that are appropriate to the selection made. For example, if the in progress field of the action taken sub record is selected, "name of creator" and "in progress as of" fields may appear. If the accept field is selected, "name of approver" and "date accepted" fields will appear. If the defer field is selected, the "name of approver" and "reason deferred" fields will appear. If the reject field is selected, the "name of approver" and "reject reason" fields will appear. If the implemented field is selected, an "implementation date" field will appear.

FIG. 13 is a screen shot illustrating one embodiment of a document record 1300 generated by documents module 416. The document record may include a reporting information section 1302 and a document information section 1304. The reader functionality for the online display module 416 may include viewing a default display. The default display may include type, category, title and status of the document. The reader functionality may also include viewing a display capturing all records from the documents section as well as attachments stored in the PIS 10. The editor functionality for the online display may include creating a document based on a program, project, or a sub-project.

The editors record functionality may include completing the required fields of the document record 1300. The required field may include category and title.

The key word fields for the document record may include type, type [category], phase, created by, team, assigned to, status and purpose. The type field may be a drop down list maintained by central administrator. The type [category] field may include a drop down list maintain by a coordinator for each program hierarchy. Other fields may include drop down lists maintain either by central administrator or the coordinator form each program hierarchy. In some fields, multiple values may be allowed. Some fields may include hard coded radio buttons.

The created by fields under document information subrecord 1304 may be pre-populated with the name of the person creating the record. The created by field may also be editable. A "created on" field may pre-populate with the current date yet also be editable. The user may populate the phase field based on a drop down box listing all phases. The current status list in the document sub-record 1304 may default to "in progress". The "assigned to" field may list the person to whom the document is assigned to be completed. The "assigned to" field may access names listed in the contacts module 419.

The purpose field may allow users to record the reason for the document. Each program may have the ability to determine its own lists of purposes. A code field added in the document information 1304 may allow the user to determine what kind of record the document is. For example, the document may be a deliverable, a template, other, etc. The comments fields may allow the user to add additional comments.

FIG. 14 is a screen shot of one embodiment of a project status report record generated by the project status report module 417. The project status report 1400 contains three illustrative sub-records. In practice, the project status report may include a plurality of sub-records 1404 similar to the sub-records 1402, 1404 shown.

The project status report 1400 includes a general sub-record 1402, a line of business information sub-record 1404 and a status summary record 1406. The reader functionality for online displays may include linking into a central location to cross-program status report display by line of business. The reader may also link to pre-define reports by the line of business, export online displays to Microsoft Excel™ or other spreadsheet application, access print preview mode prior to printing, print online displays and view a default display. The default display may include a report date, status, overall risk, LOB/SU and business unit. The default display fields of LOB/SU and business units may include only those LOB/SU and business units identified in the report.

The editor functionality for online display may include creating status reports based on initiative indicator, creating status reports based on a program, project or sub-project, creating a line of business status report and creating a business unit status report. The line of business status report may report on consolidated effort of all or a selection of line of businesses involved. In another embodiment, line of business status report would report on the consolidated effort of all or a selection of business units involved. The business unit status report may report on business unit component only. Any level in the PIS 10 hierarchy should be able to create a consolidated LOB, independent LOB or business unit status unit.

Based on the LOB creating the status report, each LOB including the LOB business units, may have their own status report template that would be called up when they create a status report. One template may be available per LOB per level within the PIS 10 hierarchy. When a consolidated status report is generated, the report creator may have the ability to edit the title of the report. When a consolidated status report is generated, each line of business and/or business unit involved should be identified.

The editor may have the ability to copy, to paste, and to update existing status report(s) including initiative status reports. The editor may also have the functionality to generate a new status report(s) or provide a button to import all fields from previous status reports. The new status report(s) would start a new record history. The editor may also have the functionality to open the status report record in edit mode, move records to the archive module 426 and remove records from the project status report section to mark them for deletion.

In the records section of the project status report section 417, a user with reader status may have the functionality to access print preview mode prior to printing, print a record, mail a record to any type of mail package and export a record to a word processing application. The mail packages to which the record may be mailed may include an Internet mail package, such as, for example, Notes™ mail, Outlook™, etc. The word processing program may include Microsoft ("MS") Word™ or any other appropriate word processing program. The report header for each sub record may include the fields of line of business, project name, initiative, program, project or subproject status report, "consolidated for", for period ending, and status. The "consolidated for" field may be followed by the business unit.

Each of the general project information field and the line of business/supporting unit field may include a header listing the section name, the audience type, the type of status report, and the functionality of the report. The functionality may include boxes indicating view project information and import project information. In the body of the subrecord, fields may be imported from the project information record for the program, project or subproject. For the general project information record 1402, the non-editable imported fields may include executive sponsor, program manager, overall project manager, start date, end date, participating LOBs and service request number. The start dates and end date may be pulled from revised date first. If the revised date is not available, then the original date may be used. The general project information subrecord may also import the editable field of project description. Subrecord 1402 is an illustration of general project information section for an audience of line of business 1. The non-editable fields and editable fields imported may vary with the audience and the desires of the user creating the report.

Subrecord 1406 is an illustration of a status summary report. The status summary subrecord 1406 is a manual table including category, risks, trend, and comments. Common status summary categories across all LOBs include overall assessment, issues, scope, schedules, resources, and financial. Other LOB defined categories may be defined. The central administrator may modify the defined categories for each LOB at each level. When performing cross LOB reports, only common categories listed above may be globally reported. The status summary risk may be manually entered at all levels. The PIS 10 may not combine status/risk data automatically. In one embodiment, the risk fields may be color coded according to risk level. For example, the risk fields may be color coded such that green status indicates no significant issues exist, yellow signifies that issues have arisen that are considered manageable, and red may indicate the significant issues have risen that put the project in jeopardy.

FIG. 15 is a screen shot illustrating one embodiment of a delivery process status section generated by the project status reports module 417. The delivery process report 1500 includes a delivery process status report 1502 and a delivery process risk status report 1504. The delivery process status report 1502 may include the functionality to hide the section, show section, view phase information and import phase dates. The delivery process phase dates may be imported as documented in the phase records.

Delivery process risk record 1504 may include the functionalities of hide section, show section, view phase information, and import phase dates. The delivery process risk record 1504 may import delivery process phase risk records. The table may contain columns listing overall risks, check point date, overall comments, additional risks, check point dates and comments for each LOB identified on the status report.

The delivery process status report 1502 may include the columns of original start date, revised start date, actual start date, original end date, revised end date and actual end date. The project status report module 417 may similarly generate tables for reports based on the other PIS 10 component modules such as project information module 412, milestone module 413, issues module 414, change control module 415, financials module 423, etc. Tables may be generated for other factors such as problem solving and other customizable sections. Initiative status reports may also be generated for viewing initiative information and importing initiative information.

FIG. 16 is a screen shot illustrating one embodiment of a team member status report. Team member status report 1600 may include a reporting information section 1602. The team member status report 1600 may be generated by team member status reports module 418. The online displays functionality for a user having reader status may include viewing a default display, exporting online display to a Microsoft Excel™ document, accessing print preview prior to printing and printing online displays. The default display may include document author, date, status and recipients ("to" field).

The editor functionality for online displays may include creating a team status report based on a program, a project or a sub-project. The editor functionality may further include copying, pasting and editing an existing team status report to generate a new team status report or provide a button to import all fields from a previous report. The new team status report would start a new record history.

In the records section of the team member status reports module 418, the reader may have the functionalities of printing the record, mailing a record to any type of mail package, accessing print preview prior to printing and exporting the record to MS Word™ or other word processing program. The editor functionality for the records section may include creating comments.

The key word fields in the team member status report may include the fields "to", team and status. The "to" and the team fields may include drop down lists allowing multiple values. The team drop down list may be maintained by the coordinator for each program hierarchy. The status field may include hard coded radio buttons. The "from" field of the reporting information section 1602 may not be editable and may be prepopulated with the name of the person creating the status report. The date field may be prepopulated with a current date and may also be editable. The subject field may be prepopulated with the current month and year followed by status report, but may also be editable. Attachments may be entered or linked from a library.

The project type and project name associated with the team member status report may be prepopulated in the team member status report. A "for period ending" field may be added that prepopulates with the current date and is also editable. The status field may be prepopulated with the "completed" circle selected. A coordinator may add text fields but the content in the text fields may not be automatically pushed or pulled to other levels in the hierarchy.

FIG. 17 is a screen shot illustrating a contact record generated by contact module 419. The contact record 1700 may include reporting information section 1702, a name of contact section 1704, a general information section 1706 and other contact information section 1708.

The reader functionality for the online displays in the contact module 419 may include viewing a default display. The default display may include name, team, phone, mail code, pager, personal identification number ("PIN") and fax. The editor functionality for the online displays may include creating contacts based on a program, project or subproject.

The editor functionality for the record section may include completing required fields such as name and employee type. The key word fields may include employee type, manager, alternate name, administrative assistant name, LOB represented, project(s), team, subteam and team role. The key word fields may include drop down lists, some of which may allow multiple values. The drop down lists may be maintained by a central administrator or coordinator, depending on design. The employee type fields may include hard coded radio buttons. In one embodiment, if a user populates a name field using the name of a employee of the entity and the address of an entity, the office phone field may also populate automatically. The contact records may come from the entities address book. The fax number may also populate if available on the user's record.

FIG. 18 is a screen shot illustrating one embodiment of a management decision record. Management decision record 1800 may include a reporting information section 1802, a decision information section 1804, and an impact information section 1806. Management decision record 1800 may be generated by management decision module 420.

Reader functionality for the management decision module 420 may include viewing a default display including title and date. The editor functionality for the online display may include creating management decisions based on a program, project or subproject.

The records functionality for the editor may include completing required fields such as decision title, decision description, decision date and person responsible in decision information section 1804. The key word fields of the management decision record 1800 may include person responsible, type, impacted project and impacted team. The key word fields may include drop down lists maintained by the coordinator, administrator or other authorized user, depending on design. Some key word fields may allow multiple values.

FIG. 19 is a screen shot illustrating one embodiment of a meeting record. Meeting record 1900 may be generated by meetings module 421. Meeting record 1900 may include a reporting information section 1902, meeting information section 1904 and meeting results section 1906. In particular, meeting results section 1906 may present information related to phase, participants, attachments, minutes and next steps.

Reader functionality for online displays for the meeting module 421 may include viewing a default display. The default display may include date, purpose, location, start time, end time, time zone, conference number and access code. The editor functionality for the record section of the meetings module 421 may include creating a meeting based on a program, project or subproject. The editor functionality may further include completing required fields in the meeting record. The required fields may include purpose, date, start time, end time, contact name and contact phone.

The key word fields for the meeting record may include purpose, time zone, project, team, primary location, other locations, contact name, phase and participants. The key word fields may include drop down lists maintained by coordinator, administrator or other authorized user. Some of the key word fields may allow multiple values. Some key word fields may include radio buttons.

In the meeting information section 1904, the start time and end time and other preselected fields may be designed to be prepopulated. For example, the start time may be prepopulated with an 8 a.m. time, the end time may prepopulate with a 9 a.m. time and the time zone field may be prepopulated with the current time zone for the user creating the record. Depending on the design, the start time and end time may be editable but the time zone may not be editable. In another embodiment, time zone may default to an eastern time zone but may be editable with a drop down list of available time zones. A contact phone field of the meeting information section 1904 may capture the phone number of the contact name from the contact record.

FIG. 20 is a screen shot illustrating one embodiment of an action item record generated by action items module 422. The action item record 2000 may include reporting information section 2002, source of action item subrecord 2004 and action item information subrecord 2006.

The online display functionality for a reader may include viewing a default display. The default display may include due date, source, action item number, description, assigned to, status and priority. The editor functionality for online displays may include creating action items based on a program, project, subproject in a module 412–423. The available modules for creation of action items may include project information module 412, milestones module 413, issues module 414, change controls module 415, documents module 416, project status reports module 417, team member status reports module 418, management decisions module 420, meetings module 421 and financials module 423.

The editor functionality in the records section of the action items module 422 may include completing required fields in the action item record such as "assign to" and "action record description".

The key word fields in the action item record may include "assign to", team, priority and status. The assign to and team fields may be drop down lists. The team field drop down list may be maintained by a coordinator for each program hierarchy. The priority and status key word fields may include hard coded radio buttons.

The date logged field may be prepopulated with the current date and may be editable. The priority field values may include "high", "medium" and "low". The default priority value may be set to "low". The status options for the status field may include open, closed or hold. The action item number field may be prepopulated with a sequential number within a program, project or subproject. The number may begin with 1 and increase in increments of 1 within each program, project or subproject. This feature of the present invention assists users understand new enhancements or production fixes that have occurred recently. The action item number may not be editable. The reporting information section 2002 in action item record 2000 may be used to track the associated program, project and subproject information along with the associated LOB and business unit information which is imported from the project information record module 412.

The section field may prepopulate based on the section where the action item is created. The phase field may pull in the phase that is listed on the source document.

FIG. 21 is a screen shot illustrating one embodiment of a financial record generated by financials module 423. Financials record 2100 may include a reporting information section 2102, an overall subrecord 2104, a tracking information subrecord 2106 and at least one line of business or supporting unit subrecord 2108.

Financial record 2100 may be generated by financials module 423. The reader functionality for the online displays for the financials module 423 may include viewing a default display. The default display may include LOB/SU, business units and at budget (overall).

The coordinator functionality for the record section of the financials module 423 may include generating a finance record each time the coordinator creates and saves a project information record in project information module 412. The LOB and support units selected on the project information record may determine the sections available on the finance record 2100. The following functionality rules for creating a financial record 2100 apply. If only one LOB or SU is chosen on the project information record 700, the financial record may display a reporting information, tracking information and selected LOB or SU. If two or more LOBs or SUs are chosen, then the finance record may display reporting information, overall information 2104, tracking information 2106 and selected LOB or SU 2108. The finance record may inherit LOB and SU selection changes from project information record 700.

In one embodiment, all LOB sections may include two parts, LOB and IT. The coordinator may have the ability to hide or show sections. If all sections are hidden, a tag line may appear indicating that all sections have been suppressed. The overall section 2104 should appear for every LOB and SU section. The overall section may include at budget and budget. The "at budget" field may be an indicator field requiring a yes or no answer. If no is chosen, the user may be required to fill out a field "if no, then comment."

The budget field may be a numeric field populated with the dollar amount (or other currency amount) of budget for the project. Other fields of overall section 2104 may include planned head count number, planned contractor head count, actual head count, actual contractor head count, planning estimate, planning launch date, commitment estimate, commitment launch date, current estimate and current launch date. Tracking information section 2106 may include major project code, subproject code, billing LOB, billing business unit, primary service request, other service requests, cost center number, cost center name, Contact Resource Request (CRR) number, Capital Expenditure Request Package (CERP) and change management number, and other information.

For each LOB or supporting unit financial record or sub record 2108, the fields available or selected may vary with the LOB/supporting unit or type of LOB/supporting unit.

The what's new module 424 may identify what is new in PIS 410. The online display reader functionality for the "what's new" module 424 may include, opening a record in read mode and identifying attachments with a paper clip icon. The editor functionality for the online display of the what's new module 424 may include opening a record in edit mode and removing records from the section to mark for deletion.

The reader functionality in the records mode of the what's new module 424 includes access to a URL linked to a PIS 10 record with an email. Editor functionality in the record mode of what's new module 424 may include modifying previously created records, determining record access and saving modified records.

The search module 425 enables searches in PIS 10. A user having reader status would have the same functionality in the search module 425 as the reader status functionality described with reference to FIG. 3.

The search module 425 may allow a user having editor status to delete selected searches. The editor may also complete required fields including Excel™ export type and record type. The editor complete optional fields such as, for example, participating LOB/SU. The participating LOB/SU field may be designated to be a required field for project search selection. Search module 425 may allow searches of other modules 412–423. Choice of record type in the search module 425 may provide users with customized search criteria depending on the module being searched. The advanced searched criteria may be edited and customized by an administrator, coordinator or other authorized user.

In one embodiment, two field name and search value areas may be displayed, depending upon which record type is selected. These fields may be able to search fields that are used globally as well as fields specific to a line of business. A search summary section may be displayed with information such as date search, last run, records found and lapse time. The search results may be exported to a predefined Excel™ template for searches of change control module 415, issues module 414, milestones module 413, project information module 412, and action items module 422. Search results may be exported to user defined Excel™ spreadsheets for all search types.

The archive module 426 may be used to store archived records. The coordinator may have the functionality to restore records from archives in the online display section of the archive module 426.

The coordinator module 427 provides additional functionality for the coordinator. The coordinator has the functionality to edit the policies and procedures module.

For online displays, the coordinator may create local [project hierarchy] keyword record, modify a local [project hierarchy] keyword record, delete records marked for deletion, return marked records for deletion to PIS 10 and send entire projects, including all associated records, to the archive 426.

In the record section, the coordinator may complete required fields in keyword records such as keyword name. The keyword records include the information in the "dropdown" lists in all of the modules. A keyword record contains two parts: (1) the category (field name from a module); and (2) the value (what the user sees in a list). Coordinators or administrators maintain these keyword lists by maintaining keyword records The coordinator may also modify previously created records.

For security access, the coordinator may assign user access to a program. Once a user has been given the role of coordinator by the central administrator, the coordinator may create as many programs as needed. The coordinators may grant access rights to users. The access rights that may be assigned include no access, reader access, and editor access. The coordinators may also assign other coordinators as coordinators for their program. A coordinator may not assign as an other coordinator for a program someone who does not have a coordinator role assigned to him/her already. Thus, a coordinator may not bypass the system to establish editors or other users as coordinators.

The central administrator module 428 provides functionality to central administrators. Functionality available to central administrators includes access to global keyword database, updates of database profile, access to PIS specific help, and assigning coordinator access at the PIS program level. The central administrator may also add or modify LOB groups. Central administrators may add LOBs at any time. Each time a new LOB is added, a LOB specific project information section is generated and a default status report header is also generated. The central administrator may also maintain online help.

For online displays, the central administrator may create database [global and LOB] keyword records, modify database [global and LOB] keyword records, and delete database [global and LOB] keyword records.

The central administrator may modify previously created database keyword records, save modified database keyword records, and modify database profiles. Types of modification may include name change for a program, project or subproject, deleted records, archived records, moved records, and modified records. The central administrator may also maintain and edit the homepage.

Line of business fields in the database profile record may determine default templates to use for project information record. The LOB fields in the database profile record may also determine default LOB names to populate in participating LOB fields in the project information record 700 under the general information section.

Subproject section for project information record 700 will determine the sections that appear in the project information record 700 anytime a coordinator creates a new subproject. Project status report guidelines include storing and modifying LOB status are use for LOB and business unit status reports. One LOB template may be used per level in the hierarchy. Application links may be available to other applications outside of PIS.

A program status report section may determine the sections that appear in the program Status Report. Title and descriptions may be added by the administrator or other authorized user for customized sections and status summary values allow status summary tables to be defined for all program status reports for the PIS 10. A project status report section and a sub-project status report section may be provided to determine the sections that appear in the project status report and a sub-project status report. The central administrators may define and show customizable fields at program level. The fields available may include table lookups and text fields.

Figure 22:
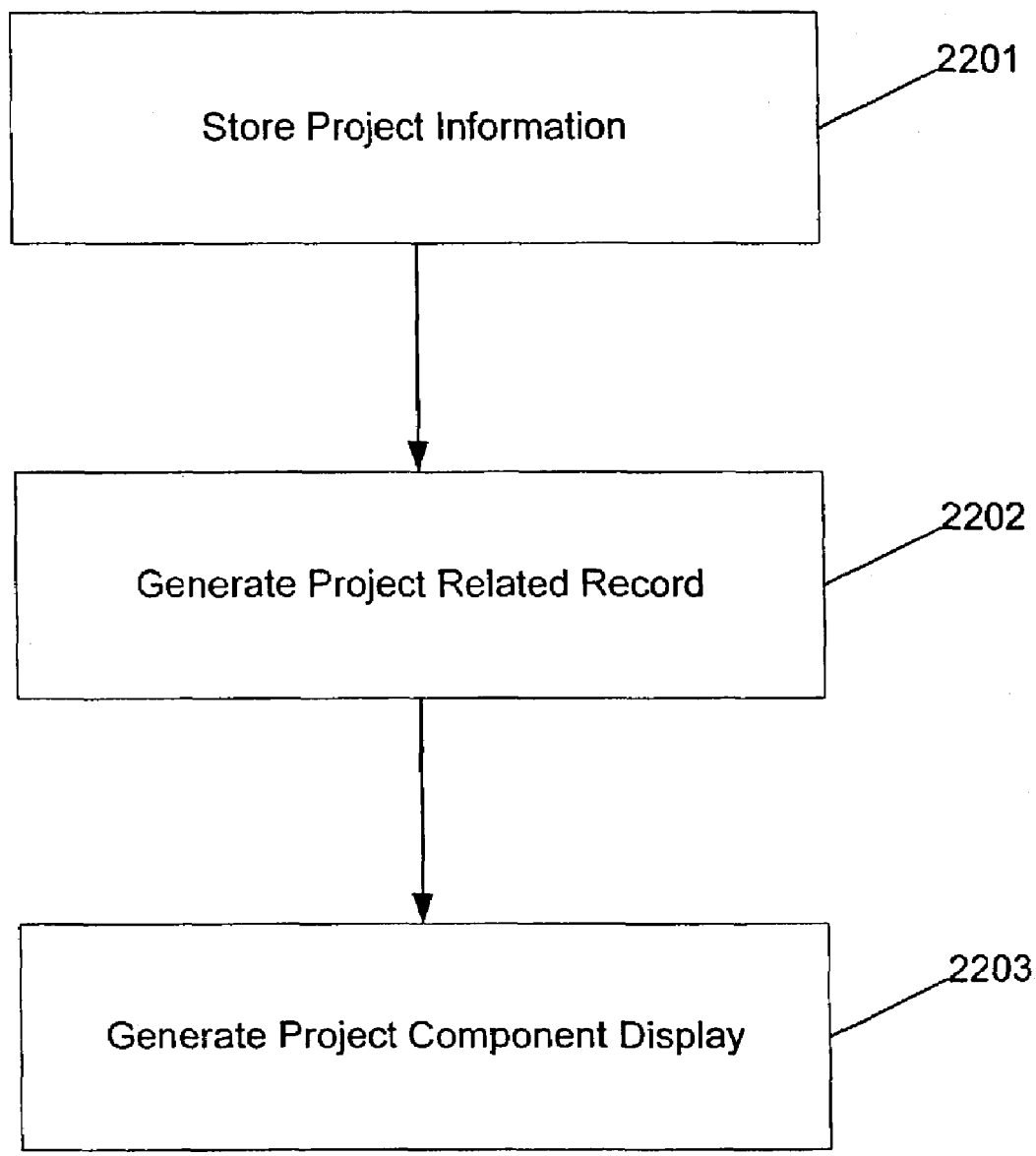
FIG. 22 is a flow diagram illustrating one embodiment of a method for managing a project.

FIG. 22 is a flow diagram illustrating one embodiment of a method for managing a project using the PIS 10. The method includes storing project information at step 2201, generating a project related record at step 2202 and generating a project component display at step 2203.

Storing the project information may include storing project information, for a first project, with associations to at least one project component so that all of the project information related to each project component is accessible by a user on a network when the project component is retrieved. In one embodiment, the project information may be received from user 1, 2 system connected to the network 5.

The project information may include project information related to at least one sub-unit of the entity performing the project. For example, the entity may be a corporation and the sub-entity may be a line of business, a business unit or other sub-entity. The project component may include at least one of the modules 411–428 of the PIS 10 shown in FIG. 4.

The step 2202 of generating the project related record may include generating at least one project component record based on the associations to the at least one project component 411–423. The project related record 542 may be used to track and manage the project. The project related record may be any record generated by modules 411–423, such as, for example, project related record 542 described with reference to FIG. 5.

In one embodiment, the project related record 542 may be created automatically when a link representing the project related record is selected by a user 2, 3. In another embodiment, the project related record 542 may be created based on user input. For example, the user may fill out fields of an on-line form and the values in the fields may be used to generate the project related record 542.

The step 2203 of generating the project component display may include generating a project component display customized to a project component 411–423. The project component display may include any display generated by modules 411–423 such as, for example, the on-line display 541 described with reference to FIG. 5. The project component display 541 may be based on at least one project component record and generated when the project component 411–423 is accessed by a user. The project component display 541 may include links to project component related documents and project component related reports.

The project component display 541 would be available to at least one user system 2, 3 over the network 5. In one embodiment, the project component display 541 may include a web page related to the project component 411–423.

In one embodiment, the project related record 542 and the project component display 541 may depend on the status of the user as described above with reference to FIG. 3.

In one embodiment, the method of FIG. 22 may further include generating a project related report as described with reference to FIGS. 7, 8 and 10–21 above. In one embodiment, each project related report may be automatically generated when a link representing the project related report is selected by a user.

The invention is related in one regard to the use of a computer system for managing project related information, using computer, network and other resources. According to one embodiment of the invention, the project information management system is provided via the computer system in response to the processor executing one or more sequences of one or more instructions contained in main memory.

Such instructions may be read into main memory from another computer-readable medium, such as the storage device. Execution of the sequences of instructions contained in main memory causes the processor to perform the process steps described herein. One or more processors in a multi-processing arrangement may also be employed to execute the sequences of instructions contained in main memory. In alternative embodiments, hard wired circuitry may be used in place of or in combination with software instructions to implement the invention. Thus, embodiments of the invention are not limited to specific combination of hardware circuitry and software.

The term "computer-readable medium" as used herein refers to any medium that participates in providing instructions to the processor for execution. Such a medium may take many forms, including but not limited to non-volatile media, volatile media, and transmission media. Non-volatile media include dynamic memory, such as main memory. Transmission media include coaxial cables, copper wire and fiber optics, including the wires that comprise the bus. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

While the foregoing description includes many details and specificities, it is to be understood that these have been included for purposes of explanation only, and are not to be interpreted as limitations of the present invention. The present invention has been generally described in relation to a network-based project information system. Nonetheless, the characteristics and parameters pertaining to the system and method of the invention may be applicable to other types of project management systems, as well as to other types of network-enabled platforms. Other modifications to the embodiments described above can be made without departing from the spirit and scope of the invention, as is intended to be encompassed by the following claims and their legal equivalents.

What is claimed is:

1. A computer implemented method for managing a project comprising the steps of:

storing project information for a first project, with associations to at least one project component so that all of the project information related to each project component is accessible by a user on a network when the at least one project component is retrieved, the project information including project information related to at least one sub-unit of an entity performing the project;

generating at least one project component record based on the associations to the at least one project component for managing the project;

generating a project component display, customized to a project component and based on the at least one project component record, when the at least one project component is accessed by a user, the project component display having links to project component related documents and project component related reports and available to at least one user system over the network;

checking a status identifier of a user, wherein the step of generating the at least one project component record comprises a step of generating a project component record based on the user's status and a step of generating the project component display comprises a step of generating the project component display based on the user's status;

determining the user's status based on predetermined formula;

presenting the user with reader intended project management sub-units if the user has a reader status;

presenting the user with editor intended project management sub-units if the user has an editor status;

presenting the user with a coordinator intended project management sub-units if the user has a coordinator status; and presenting the user with a central administrator status if the user has a central administrator status.

2. The method of claim 1, wherein the step of generating the project component display comprises a step of generating a project component web page.

3. The method of claim 1, wherein the at least one project component comprises at least one or more of a home page module, a project information module, a milestones module, a issues module, a change controls module, a documents module, a project status reports module, a team member status reports module, a contacts module, a management decisions module, a meetings module, an action items module, a financials module, a new items module, a search module, an archive module, a project management system coordinator module and a central project management system administrator module.

4. The method of claim 1, wherein generating the at least one project component record comprises automatically creating the at least one project component record if a link to the project related record is selected by a user.

5. The method of claim 1, wherein the step of generating the at least one project component record comprises a step of creating the at least one project component record based on user input.

6. The method of claim 1, further comprising a step of receiving the project information from a user connected to the network.

7. The method of claim 1, further comprising a step of assigning a reader status to a user if the user does not have an associated status and the user is a first type user; and assigning a no access status to a user if the user does not have an associated status and the user is a second type user.

8. The method of claim 1, further comprising a step of creating at least one project related report.

9. The method of claim 7, wherein a first type user comprises an employee of the entity performing the project and a second type user comprises at least one of a vendor and a contractor of the entity performing the project.

10. The method of claim 8, wherein the step of creating the at least one project related report comprises a step of automatically creating the at least one project related report if a link to the project related report is selected by a user.

11. The method of claim 8, wherein the step of creating the at least one project related report comprises a step of creating the at least one project related report based on user input.

12. A computer implemented system for managing a project comprising:
means for storing project information, for a first project, with associations to at least one project component so that all of the project information related to each project component is accessible by a user on a network when the project component is retrieved, the project information including project information related to at least one sub-unit of an entity performing the project;
means for generating at least one project component record based on the associations to the at least one project component for managing the project; and
means for generating a project component display, customized to a project component and based on the at least one project component record, when the project component is accessed by a user, the project component display having links to project component related documents and project component related reports and available to at least one user system over the network;
means for checking a status identifier of a user, wherein the means for generating the project component display comprises means for generating a project component display based on the user's status and the means for generating the at least one project component record comprises means for generating the project component record based on the user's status;
means for determining the user's status based on predetermined formula;
means for presenting the user with reader intended project management sub-units if the user has a reader status;
means for presenting the user with editor intended project management sub-units if the user has an editor status;
means for presenting the user with a coordinator intended project management sub-units if the user has a coordinator status; and
means for presenting the user with a central administrator status if the user has a central administrator status.

13. The system of claim 12, wherein the means for generating the project component display comprises means for generating a project component web page.

14. The system of claim 12, wherein the at least one project component comprises at least one or more of a home module, a project information module, a milestones module, a issues module, a change controls module, a documents module, a project status reports module, a team member status reports module, a contacts module, a management decisions module, a meetings module, an action items module, a financials module, a new items module, a search module, an archive module, a project management system coordinator module and a central project management system administrator module.

15. The system of claim 12, wherein the means for generating the at least one project component record comprises means for automatically creating the at least one project component record if a link to the project related record is selected by a user.

16. The system of claim 12, wherein the means for generating the at least one project component record comprises means for creating the at least one project component record based on user input.

17. The system of claim 12, further comprising means for receiving the project information from a user connected to the network.

18. The system of claim 12, further comprising means for assigning a reader status to a user if the user does not have an associated status and the user is a first type user, and means for assigning a no access status to a user if the user does not have an associated status and the user is a second type user.

19. The system of claim 12, further comprising means for creating at least one project related report.

20. The system of claim 13, wherein a first type user comprises an employee of the entity performing the project and a second type user comprises at least one of a vendor and a contractor of the entity performing the project.

21. The system of claim 19, wherein the means for creating the at least one project related report comprises automatically means for creating the at least one project related report if a link to the project related report is selected by a user.

22. The system of claim 19, wherein the means for creating the at least one project related report comprises means for creating the at least one project related report based on user input.

* * * * *